(12) United States Patent
Huang et al.

(10) Patent No.: US 12,471,167 B2
(45) Date of Patent: *Nov. 11, 2025

(54) TECHNIQUES FOR DEPENDENT PROCEDURE OPERATION IMPACTED BY LINK CANCELLATION

(71) Applicant: QUALCOMM Incorporated, San Diego, CA (US)

(72) Inventors: Yi Huang, San Diego, CA (US); Peter Gaal, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,991

(22) Filed: Dec. 13, 2023

(65) Prior Publication Data
US 2024/0114575 A1    Apr. 4, 2024

Related U.S. Application Data

(63) Continuation of application No. 17/444,423, filed on Aug. 4, 2021, now Pat. No. 11,882,612.
(Continued)

(51) Int. Cl.
*H04W 76/18* (2018.01)
*H04L 1/00* (2006.01)
(Continued)

(52) U.S. Cl.
CPC ........... *H04W 76/18* (2018.02); *H04L 5/0007* (2013.01); *H04L 5/0053* (2013.01);
(Continued)

(58) Field of Classification Search
CPC . H04W 76/18; H04W 52/146; H04W 52/365; H04W 52/367; H04W 28/04;
(Continued)

(56) References Cited

U.S. PATENT DOCUMENTS 9,503,231 B2    11/2016   Gaal et al.
2019/0372727 A1   12/2019   Joseph et al.
(Continued)

FOREIGN PATENT DOCUMENTS

KR   20190098708 A   8/2019
WO   2012064783      5/2012

OTHER PUBLICATIONS

Asia Pacific Telecom: "Considerations on UL Inter-UE Prioritization and Multiplexing", 3GPP Draft, R1-1912254, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823325, 6 Pages, p. 4, Proposal 4, the whole document.
(Continued)

*Primary Examiner* — Brian T Le
(74) *Attorney, Agent, or Firm* — QUALCOMM Incorporated

(57) ABSTRACT

Techniques described provide dependent procedure operation configured for avoiding or mitigating one or more aspect of the impact on the dependent procedure of cancelling an uplink transmission. One or more attributes (e.g., a transmission indication attribute) associated with a cancelled uplink transmission may be designated for dependent procedure operation, such as for indicating whether the cancelled uplink transmission is considered either as having been transmitted or not having been transmitted. The one or more attributes associated with a cancelled uplink transmission designated for dependent procedure operation may be based upon whether the cancelling the first uplink transmission is a fast cancellation or is a slow cancellation. The designation of a transmission indication attribute for dependent procedure operation may correspond to the dependent
(Continued)

procedure and/or its operation. Other aspects and features are also claimed and described.

18 Claims, 7 Drawing Sheets

Related U.S. Application Data

(60) Provisional application No. 63/062,886, filed on Aug. 7, 2020.

(51) Int. Cl.
    *H04L 1/1812*     (2023.01)
    *H04L 5/00*     (2006.01)
    *H04W 52/14*     (2009.01)
    *H04W 52/36*     (2009.01)

(52) U.S. Cl.
    CPC ....... *H04W 52/146* (2013.01); *H04W 52/365* (2013.01); *H04W 52/367* (2013.01); *H04L 1/0003* (2013.01); *H04L 1/1812* (2013.01)

(58) Field of Classification Search
    CPC .... H04W 28/22; H04W 48/02; H04L 5/0007; H04L 5/0053; H04L 5/0048; H04L 1/0003; H04L 1/1812; H04L 47/74; H04L 12/4013; H04L 12/40136; H04B 1/00
    See application file for complete search history.

(56) References Cited

U.S. PATENT DOCUMENTS

| | | |
|---|---|---|
| 2021/0168848 A1 | 6/2021 | Chatterjee et al. |
| 2022/0046739 A1 | 2/2022 | Huang et al. |
| 2023/0036943 A1 | 2/2023 | Xiao et al. |

OTHER PUBLICATIONS

International Preliminary Report On Patentability—PCT/US2021/071121—The International Bureau of WIPO—Geneva, Switzerland—Feb. 16, 2023 (207350WO).
International Search Report and Written Opinion—PCT/US2021/071121—ISA/EPO—Dec. 6, 2021 (207350WO).
Vivo: "UL Inter-UE Tx Prioritization for URLLC", 3GPP Draft, 3GPP TSG RAN WG1 #97, R1-1906150_ UL Inter UE TX Prioritization for URLLC, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 1, 2019 (May 1, 2019), XP051708191, 13 Pages, pp. 1-9, the whole document.

TECHNIQUES FOR DEPENDENT PROCEDURE OPERATION IMPACTED BY LINK CANCELLATION

CROSS-REFERENCE TO RELATED APPLICATIONS

This application is a continuation and claims the benefit of U.S. patent application Ser. No. 17/444,423, entitled, "TECHNIQUES FOR DEPENDENT PROCEDURE OPERATION IMPACTED BY LINK CANCELLATION," filed on Aug. 4, 2021, and also claims the benefit of U.S. Provisional Patent Application No. 63/062,886, entitled, "TECHNIQUES FOR DEPENDENT PROCEDURE OPERATION IMPACTED BY UPLINK CANCELLATION," filed on Aug. 7, 2020, the disclosures of which are hereby incorporated by reference herein in their entirety as if fully set forth below and for all applicable purposes.

TECHNICAL FIELD

Aspects of the present disclosure relate generally to wireless communication systems, and more particularly, to operation in light of cancellation (e.g., full or partial dropping or cancelling) of transmissions via a link established between devices of a wireless communication system. Certain embodiments of the technology discussed below can enable and provide techniques for dependent procedure operation impacted by uplink cancellation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Interference and other factors may result in instances of various transmissions being cancelled, disturbed, dropped, etc. or otherwise negatively impacted. For example, one or more uplink transmissions from a UE to a base station may be fully or partially dropped or cancelled. Cancellation, droppage, or disturbance of transmissions can cause user dissatisfaction, impact subsequent operation of the communication device, degrade communication performance, affect system operation and throughput, etc.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include cancelling a first uplink transmission. Cancelling the first uplink transmission may be a fast cancellation if the first uplink transmission is cancelled with insufficient time for a device transmitting the first uplink transmission to meet a first one or more timelines of a plurality of timelines. Cancelling the first uplink transmission may be a slow cancellation if the first uplink transmission is cancelled with sufficient time for the device transmitting the first uplink transmission to meet a second one or more timelines of a plurality of timelines. A method may also include providing a transmission indication attribute corresponding to the cancelling the first uplink transmission for operation of a dependent procedure. The transmission indication attribute may indicate to the dependent procedure that the first uplink transmission is considered as transmitted or is considered as not transmitted in correspondence with the cancelling the first uplink transmission being the fast cancellation or the slow cancellation.

In an additional aspect of the disclosure, an apparatus configured for wireless communication is provided. An apparatus may include means for cancelling a first uplink transmission. Cancelling the first uplink transmission may be a fast cancellation if the first uplink transmission is cancelled with insufficient time for a device transmitting the first uplink transmission to meet a first one or more timelines of a plurality of timelines. Cancelling the first uplink transmission may be a slow cancellation if the first uplink transmission is cancelled with sufficient time for the device transmitting the first uplink transmission to meet a second one or more timelines of the plurality of timelines. An apparatus may also include means for providing a transmission indication attribute corresponding to the cancelling the first uplink transmission for operation of a dependent procedure. The transmission indication attribute may indicate to the dependent procedure that the first uplink transmission is considered as transmitted or is considered as not transmitted in correspondence with the cancelling the first uplink transmission being the fast cancellation or the slow cancellation.

In an additional aspect of the disclosure, a non-transitory computer-readable medium having program code recorded thereon for wireless communication is provided. Program code may include code to cancel a first uplink transmission. Cancelling the first uplink transmission may be a fast cancellation if the first uplink transmission is cancelled with insufficient time for a device transmitting the first uplink transmission to meet a first one or more timelines of a plurality of timelines. Cancelling the first uplink transmission may be a slow cancellation if the first uplink transmission is cancelled with sufficient time for the device transmitting the first uplink transmission to meet a second one or more timelines of the plurality of timelines. Program code may also include code to provide a transmission indication attribute corresponding to the cancelling the first uplink transmission for operation of a dependent procedure. The transmission indication attribute may indicate to the dependent procedure that the first uplink transmission is considered as transmitted or is considered as not transmitted in correspondence with the cancelling the first uplink transmission being the fast cancellation or the slow cancellation.

In an additional aspect of the disclosure, an apparatus configured for wireless communication is provided. The apparatus includes at least one processor, and a memory coupled to the processor. A processor may be configured to cancel a first uplink transmission. Cancelling the first uplink transmission may be a fast cancellation if the first uplink transmission is cancelled with insufficient time for a device transmitting the first uplink transmission to meet a first one or more timelines of a plurality of timelines. Cancellation of the first uplink transmission may be a slow cancellation if the first uplink transmission is cancelled with sufficient time for the device transmitting the first uplink transmission to meet a second one or more timelines of the plurality of timelines. A processor may also be configured to provide a transmission indication attribute corresponding to the cancelling the first uplink transmission for operation of a dependent procedure. The transmission indication attribute may indicate to the dependent procedure that the first uplink transmission is considered as transmitted or is considered as not transmitted in correspondence with the cancelling the first uplink transmission being the fast cancellation or the slow cancellation.

In one aspect of the disclosure, a method of wireless communication is provided. A method may include determining cancellation of a first uplink transmission to be fast cancellation or slow cancellation. A method may also include designating a first uplink transmission attribute for dependent procedure operation based upon whether the cancellation of the first uplink transmission is determined to be fast cancellation or is determined to be slow cancellation. In accordance with some aspects, the dependent procedure may be a procedure that is impacted by the cancellation of the first uplink transmission.

In an additional aspect of the disclosure, an apparatus configured for wireless communication is provided. An apparatus may include means for determining cancellation of a first uplink transmission to be fast cancellation or slow cancellation. An apparatus may also include means for designating a first uplink transmission attribute for dependent procedure operation based upon whether the cancellation of the first uplink transmission is determined to be fast cancellation or is determined to be slow cancellation. In accordance with some aspects, the dependent procedure may be a procedure that is impacted by the cancellation of the first uplink transmission.

In an additional aspect of the disclosure, a non-transitory computer-readable medium having program code recorded thereon for wireless communication is provided. Program code may include code to determine cancellation of a first uplink transmission to be fast cancellation or slow cancellation. Program code may also include code to designate a first uplink transmission attribute for dependent procedure operation based upon whether the cancellation of the first uplink transmission is determined to be fast cancellation or is determined to be slow cancellation. In accordance with some aspects, the dependent procedure may be a procedure that is impacted by the cancellation of the first uplink transmission.

In an additional aspect of the disclosure, an apparatus configured for wireless communication is provided. The apparatus includes at least one processor, and a memory coupled to the processor. A processor may be configured to determine cancellation of a first uplink transmission to be fast cancellation or slow cancellation. A processor may also be configured to designate a first uplink transmission attribute for dependent procedure operation based upon whether the cancellation of the first uplink transmission is determined to be fast cancellation or is determined to be slow cancellation. In accordance with some aspects, the dependent procedure may be a procedure that is impacted by the cancellation of the first uplink transmission.

In accordance with aspects of the disclosure, the foregoing systems, methods, and apparatuses may be implemented in combination with one or more additional features, such as the following features whether alone or in combination. For example, the above systems, methods, and apparatuses may include cancellation of the first uplink transmission including an abortive uplink transmission selected from the group consisting of partially dropped transmission, partially cancelled transmission, fully dropped transmission, and fully cancelled transmission. The above systems, methods, and apparatuses may include cancellation of the first uplink transmission being due to at least one of transmission prioritization, uplink skipping, scheduling cancellation, scheduling overlap, power limitation, measurement gap, or conflict with a sidelink. The above systems, methods, and apparatuses may include the cancellation of the first uplink transmission being determined to be fast cancellation if the first uplink transmission is cancelled with insufficient time for cancellation processing by a device putatively transmitting the first uplink transmission to meet one or more timelines. The above systems, methods, and apparatuses may include the cancellation of the first uplink transmission being determined to be slow cancellation if the first uplink transmission is cancelled with sufficient time for cancellation processing by a device putatively transmitting the first uplink transmission to meet one or more timelines.

The foregoing systems, methods, and apparatuses may be implemented in combination with yet one or more additional features, such as the following features whether alone or in combination. For example, the above systems, methods, and apparatuses may include the one or more timelines including a timeline selected from a N1 timeline establishing a minimum gap from a last orthogonal frequency division multiplex (OFDM) symbol of a physical downlink shared channel (PDSCH) to a first OFDM symbol of hybrid automatic repeat request (HARQ) acknowledgment (ACK) transmission and a N2 timeline establishing a minimum gap from a last OFDM symbol of uplink downlink control information (DCI) to an OFDM symbol of a physical uplink shared channel (PUSCH) transmission. The above systems, methods, and apparatuses may include the first uplink transmission attribute designated for the dependent procedure operation based upon whether the cancellation of the first uplink transmission is determined to be fast cancellation or is determined to be slow cancellation including a transmission indication attribute.

The foregoing systems, methods, and apparatuses may further be implemented in combination with one or more additional features, such as the following features whether alone or in combination. For example, the above systems, methods, and apparatuses may include the transmission indication attribute indicating to the dependent procedure that the first uplink transmission is considered as having been transmitted or is considered as not having been transmitted. The above systems, methods, and apparatuses may include the dependent procedure including a transmission power control (TPC) accumulation procedure, and the transmission indication attribute indicating that the first uplink transmission is considered as having been transmitted when the first uplink transmission is determined to be fast cancellation. The above systems, methods, and apparatuses may include the dependent procedure including a TPC accumulation procedure, and the transmission indication attribute indicating that the first uplink transmission is considered as having been transmitted when the first uplink transmission is determined to be slow cancellation.

Moreover, the foregoing systems, methods, and apparatuses may be implemented in combination with one or more additional features, such as the following features whether alone or in combination. For example, the above systems, methods, and apparatuses may include the dependent procedure including a component carrier (CC) power scaling procedure, and the transmission indication attribute indicating that the first uplink transmission is considered as having been transmitted when the first uplink transmission is determined to be fast cancellation. The above systems, methods, and apparatuses may include the dependent procedure including a CC power scaling procedure, and the transmission indication attribute indicating that the first uplink transmission is considered as having n been transmitted when the first uplink transmission is determined to be slow cancellation. The above systems, methods, and apparatuses may include the dependent procedure including a CC maximum power reduction (MPR) procedure, and the transmission indication attribute indicating that the first uplink transmission is considered as having been transmitted when the first uplink transmission is determined to be fast cancellation. The above systems, methods, and apparatuses may include the dependent procedure including a CC MPR procedure, and the transmission indication attribute indicating that the first uplink transmission is considered as having not been transmitted when the first uplink transmission is determined to be slow cancellation.

The foregoing systems, methods, and apparatuses may further be implemented in combination with yet one or more additional features, such as the following features whether alone or in combination. For example, the above systems, methods, and apparatuses may include the dependent procedure including a half duplex handling procedure, and the transmission indication attribute indicating that the first uplink transmission is considered as having been transmitted when the first uplink transmission is determined to be fast cancellation. The above systems, methods, and apparatuses may include the dependent procedure including a half duplex handling procedure, and the transmission indication attribute indicating that the first uplink transmission is considered as having not been transmitted when the first uplink transmission is determined to be slow cancellation.

The foregoing systems, methods, and apparatuses may be implemented in combination with yet one or more additional features, such as the following features whether alone or in combination. For example, the above systems, methods, and apparatuses may include the dependent procedure including a new data indicator (NDI) interpretation procedure, and the transmission indication attribute indicating that the first uplink transmission is considered as having been transmitted when the first uplink transmission is determined to be fast cancellation. The above systems, methods, and apparatuses may include the dependent procedure including a NDI interpretation procedure, and the transmission indication attribute indicating that the first uplink transmission is considered as having been transmitted when the first uplink transmission is determined to be slow cancellation.

The foregoing systems, methods, and apparatuses may further be implemented in combination with yet one or more additional features, such as the following features whether alone or in combination. For example, the above systems, methods, and apparatuses may include the dependent procedure including a power headroom report (PHR) in re-transmission procedure, and the transmission indication attribute indicating that the first uplink transmission is considered as having been transmitted when the first uplink transmission is determined to be fast cancellation. The above systems, methods, and apparatuses may include the dependent procedure including a PHR in re-transmission procedure, and the transmission indication attribute indicating that the first uplink transmission is considered as having been transmitted when the first uplink transmission is determined to be slow cancellation.

Moreover, the foregoing systems, methods, and apparatuses may be implemented in combination with one or more additional features, such as the following features whether alone or in combination. For example, the above systems, methods, and apparatuses may include the dependent procedure including a hybrid automatic repeat request (HARQ) out-of-order procedure, and the transmission indication attribute indicating that the first uplink transmission is considered as having been transmitted when the first uplink transmission is determined to be fast cancellation. The above systems, methods, and apparatuses may include the dependent procedure including a HARQ out-of-order procedure, and the transmission indication attribute indicating that the first uplink transmission is considered as having been transmitted when the first uplink transmission is determined to be slow cancellation.

The foregoing systems, methods, and apparatuses may further be implemented in combination with one or more additional features, such as the following features whether alone or in combination. For example, the above systems, methods, and apparatuses may include the dependent procedure including a carrier aggregation (CA) based secondary reference signal (SRS) switching preemption procedure, and the transmission indication attribute indicating that the first uplink transmission is considered as having been transmitted when the first uplink transmission is determined to be fast cancellation. The above systems, methods, and apparatuses may include the dependent procedure including a CA based SRS procedure, and the transmission indication attribute indicating that the first uplink transmission is considered as having not been transmitted when the first uplink transmission is determined to be slow cancellation.

The foregoing systems, methods, and apparatuses may be implemented in combination with still yet one or more additional features, such as the following features whether alone or in combination. For example, The above systems, methods, and apparatuses may include the dependent procedure including a SRS for non-codebook based procedure, and the transmission indication attribute indicating that the first uplink transmission is considered as having not been transmitted when the first uplink transmission is determined to be fast cancellation. The above systems, methods, and apparatuses may include the dependent procedure including a SRS for non-codebook based procedure, and the transmission indication attribute indicating that the first uplink transmission is considered as having not been transmitted when the first uplink transmission is determined to be slow cancellation.

Further, the foregoing systems, methods, and apparatuses may be implemented in combination with one or more additional features, such as the following features whether alone or in combination. For example, the above systems, methods, and apparatuses may include the dependent procedure including an interpretation of reserved modulation coding scheme (MCS) procedure, and the transmission indication attribute indicating that the first uplink transmission is considered as having been transmitted when the first uplink transmission is determined to be fast cancellation. The above systems, methods, and apparatuses may include the dependent procedure including an interpretation of reserved MCS procedure, and the transmission indication attribute indicating that the first uplink transmission is considered as having been transmitted when the first uplink transmission is determined to be slow cancellation.

The foregoing systems, methods, and apparatuses may be implemented in combination with yet still one or more additional features, such as the following features whether alone or in combination. For example, the above systems, methods, and apparatuses may include the dependent procedure including an uplink (UL) transmit switching state procedure, and the transmission indication attribute indicating that the first uplink transmission is considered as having been transmitted when the first uplink transmission is determined to be fast cancellation. The above systems, methods, and apparatuses may include the dependent procedure including an UL transmit switching state procedure, and the transmission indication attribute indicating that the first uplink transmission is considered as having not been transmitted when the first uplink transmission is determined to be slow cancellation.

The foregoing systems, methods, and apparatuses may be implemented in combination with yet one or more additional features, such as the following features whether alone or in combination. For example, the above systems, methods, and apparatuses may include the dependent procedure including a determination of duplex direction procedure, and the transmission indication attribute indicating that the first uplink transmission is considered as having been transmitted when the first uplink transmission is determined to be fast cancellation. The above systems, methods, and apparatuses may include the dependent procedure including a determination of duplex direction procedure, and the transmission indication attribute indicating that the first uplink transmission is considered as having not been transmitted when the first uplink transmission is determined to be slow cancellation.

The foregoing systems, methods, and apparatuses may further be implemented in combination with one or more additional features, such as the following features whether alone or in combination. For example, the above systems, methods, and apparatuses may include the dependent procedure including a SRS codebook based procedure, and the transmission indication attribute indicating that the first uplink transmission is considered as having not been transmitted when the first uplink transmission is determined to be fast cancellation. The above systems, methods, and apparatuses may include the dependent procedure including a SRS codebook based procedure, and the transmission indication attribute indicating that the first uplink transmission is considered as having not been transmitted when the first uplink transmission is determined to be slow cancellation.

Moreover, the foregoing systems, methods, and apparatuses may be implemented in combination with one or more additional features, such as the following features whether alone or in combination. For example, the above systems, methods, and apparatuses may include the dependent procedure including a counting of active CSI resources procedure, and the transmission indication attribute indicating that the first uplink transmission is considered as having been transmitted when the first uplink transmission is determined to be fast cancellation. The above systems, methods, and apparatuses may include the dependent procedure including a counting of active CSI resources procedure, and the transmission indication attribute indicating that the first uplink transmission is considered as having been transmitted when the first uplink transmission is determined to be slow cancellation.

The foregoing systems, methods, and apparatuses may be implemented in combination with yet one or more additional features, such as the following features whether alone or in combination. For example, the above systems, methods, and apparatuses may include the dependent procedure including a medium access control (MAC) control element (CE) action time procedure, and the transmission indication attribute indicating that the first uplink transmission is considered as having been transmitted when the first uplink transmission is determined to be fast cancellation. The above systems, methods, and apparatuses may include the dependent procedure including a MAC CE action time procedure, and the transmission indication attribute indicating that the first uplink transmission is considered as having been transmitted when the first uplink transmission is determined to be slow cancellation.

The foregoing systems, methods, and apparatuses may further be implemented in combination with yet one or more additional features, such as the following features whether alone or in combination. For example, the above systems, methods, and apparatuses may include the dependent procedure including a buffer state report (BSR) procedure, and the transmission indication attribute indicating that the first uplink transmission is considered as having been transmitted when the first uplink transmission is determined to be fast cancellation. The above systems, methods, and apparatuses may include the dependent procedure including a BSR procedure, and the transmission indication attribute indicating that the first uplink transmission is considered as having not been transmitted when the first uplink transmission is determined to be slow cancellation.

Further, the foregoing systems, methods, and apparatuses may be implemented in combination with one or more additional features, such as the following features whether alone or in combination. For example, the above systems, methods, and apparatuses may include the dependent procedure including a round trip time (RTT) timer procedure, and the transmission indication attribute indicating that the first uplink transmission is considered as having not been transmitted when the first uplink transmission is determined to be fast cancellation. The above systems, methods, and apparatuses may include the dependent procedure including a RTT timer procedure, and the transmission indication attribute indicating that the first uplink transmission is considered as having not been transmitted when the first uplink transmission is determined to be slow cancellation.

The foregoing systems, methods, and apparatuses may be implemented in combination with yet one or more additional features, such as the following features whether alone or in combination. For example, the above systems, methods, and apparatuses may include the dependent procedure including a HARQ attempt count procedure, and the transmission indication attribute indicating that the first uplink transmission is considered as having been transmitted when the first uplink transmission is determined to be fast cancellation.

The above systems, methods, and apparatuses may include the dependent procedure including a HARQ attempt count procedure, and the transmission indication attribute indicating that the first uplink transmission is considered as having not been transmitted when the first uplink transmission is determined to be slow cancellation.

The foregoing systems, methods, and apparatuses may further be implemented in combination with one or more additional features, such as the following features whether alone or in combination. For example, the above systems, methods, and apparatuses may include the dependent procedure including a PHR calculation procedure, and the transmission indication attribute indicating that the first uplink transmission is considered as having been transmitted when the first uplink transmission is determined to be fast cancellation. The above systems, methods, and apparatuses may include the dependent procedure including a PHR calculation procedure, and the transmission indication attribute indicating that the first uplink transmission is considered as having not been transmitted when the first uplink transmission is determined to be slow cancellation.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
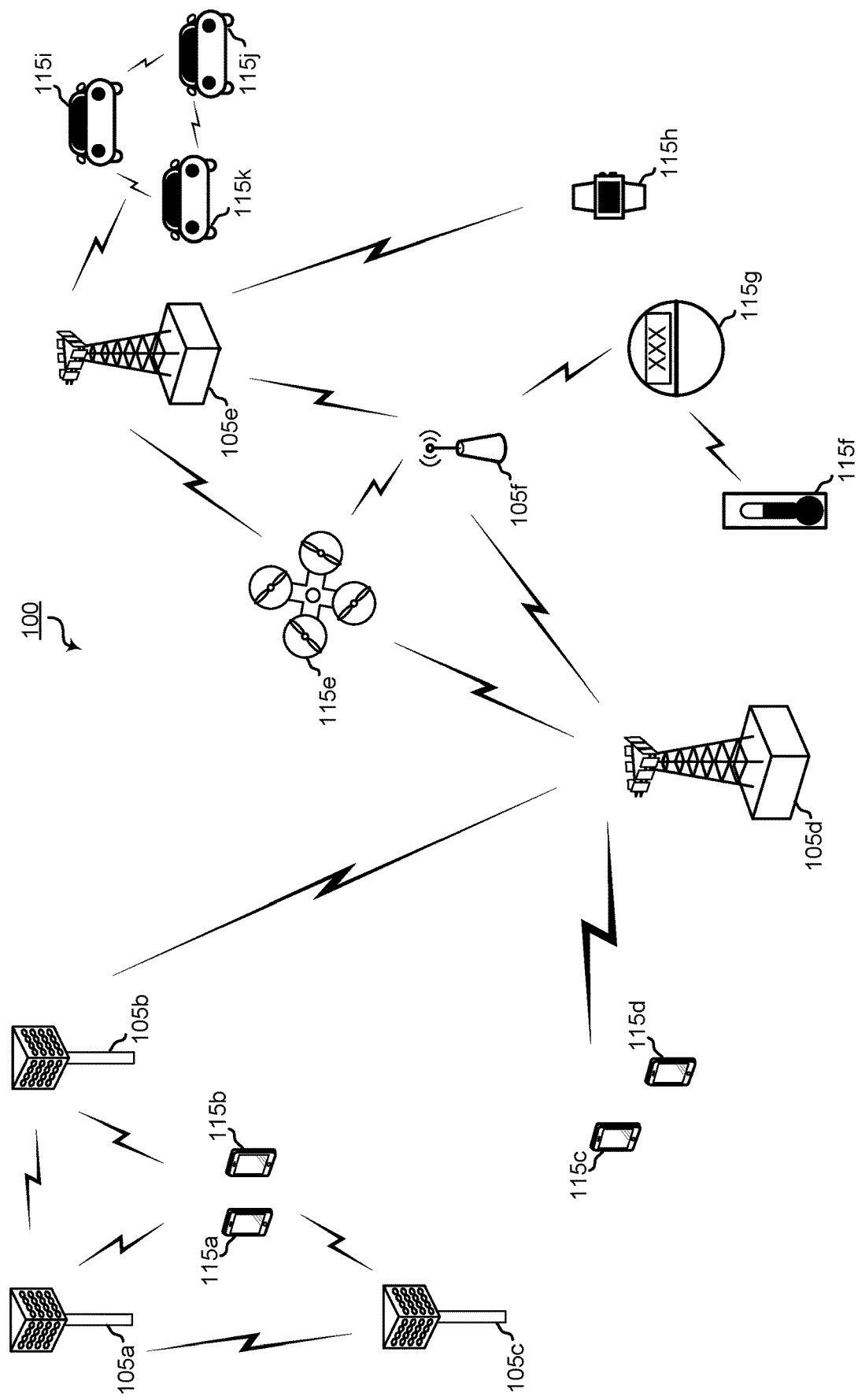
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3 GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~ 10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, aggregated or disaggregated deployments, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
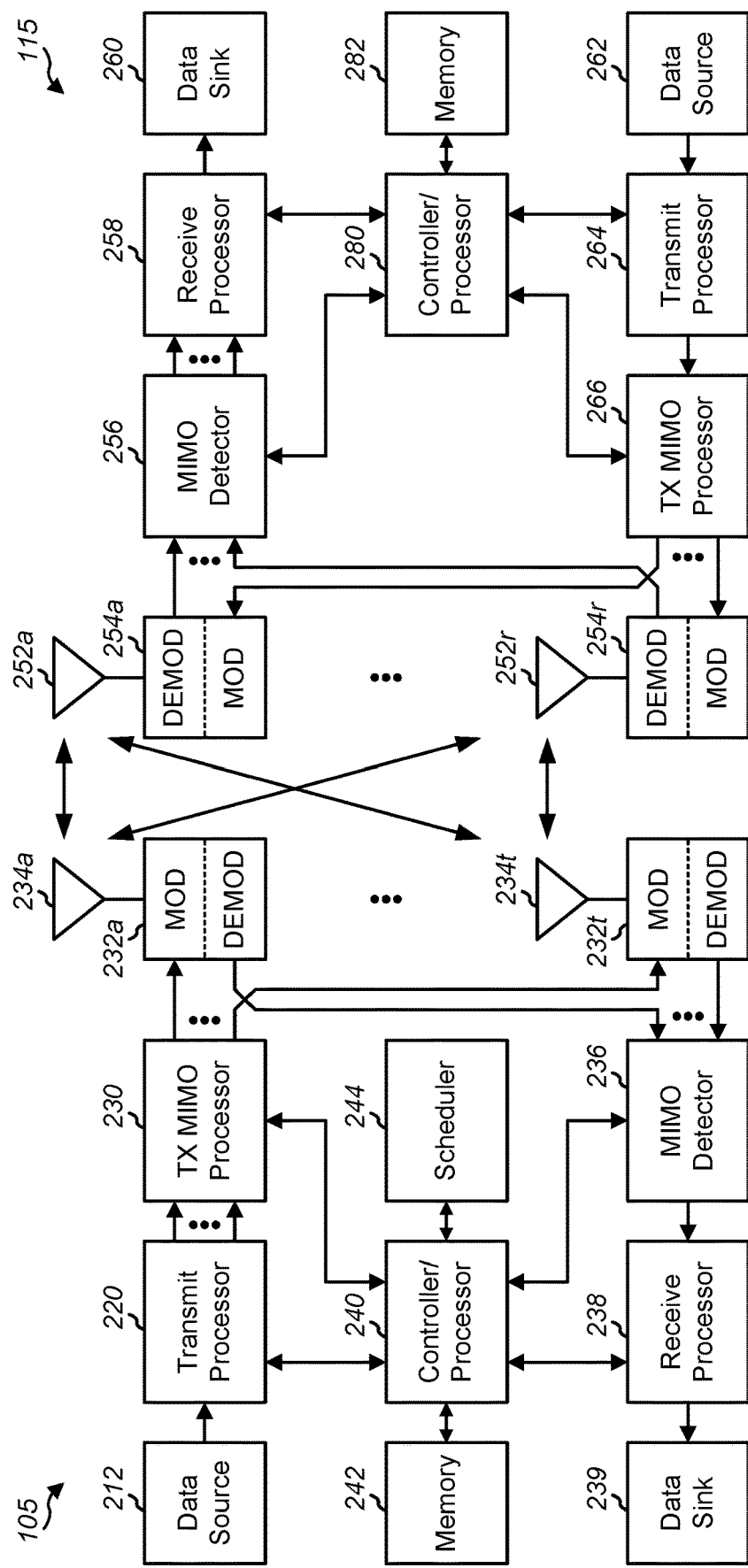
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 6, and/or other processes for the techniques described herein. Memories 242 and 282 may store data and program codes for base station 105 and UE 115, respectively. Scheduler 244 may schedule UEs for data transmission on the downlink and/or uplink.

Instances of various transmissions between communication devices of wireless network 100 may be cancelled, dropped, aborted, etc. (collectively referred to herein as cancelled) due to a number of causes. Cancelled transmissions may, for example, include abortive transmissions in the form of partially dropped transmissions, partially cancelled transmissions, fully dropped transmissions, fully cancelled transmissions, and/or the like. For example, uplink transmission may be partially or fully dropped or cancelled due to transmission prioritization, uplink skipping, scheduling cancellation, scheduling overlap, power limitation, measurement gap, conflict with a sidelink, etc. Cancelled transmissions of some examples may include active cancelling, dropping, aborting, etc. of transmissions, passive cancelling, dropping, aborting, etc., or a combination thereof.

Partially or fully cancelled uplink transmissions from a first communication device (e.g., UE) to a second communication device (e.g., base station) in communication via an uplink of wireless network 100 may, in addition to possibly causing user dissatisfaction, communication performance degradation, etc., impact subsequent operation of one or more procedures performed by the either or both communication devices. The cancelled transmission may, for example, comprise a data transmission, a control signal transmission, a reporting transmission, a request transmission, a transmission in response to a received transmission, etc. There may be one or more procedures being performed and/or subsequently to be performed by a communication device (e.g., UE) that are dependent on an uplink transmission having been performed. For example, procedures for reporting information may alter their operation in light of transmission of a report (e.g., to initiate monitoring for updated information, to provide abbreviated update reporting, etc.). Procedures for reporting information may proceed to alter their operation after a scheduled report transmission, and/or may experience degraded operation, performance, throughput, user experience, etc. in situations where a scheduled transmission is cancelled. Procedures for reporting information may thus be procedures that are impacted by cancelling of an uplink transmission. As another example, procedures for calculating information may alter their operation in light of transmission of certain information (e.g., to initiate a timer for subsequent calculation, to perform update calculations, etc.). Procedures for calculating information may proceed to alter their operation after a scheduled transmission of certain information, and/or may experience degraded operation, performance, throughput, user experience, etc. in situations where a scheduled transmission is cancelled. Procedures for calculating information may thus be procedures that are impacted by cancelling of an uplink transmission. As still another example, procedures for operating a timer may trigger their operation in light of transmission of certain information (e.g., to start, stop, reset, etc. one or more timers). Procedures for operating a timer may trigger their operation after a scheduled transmission of certain information, and/or may experience degraded operation, performance, throughput, user experience, etc. in situations where a scheduled transmission is cancelled. Procedures for operating a timer may thus be procedures that are impacted by cancelling of an uplink transmission. Such procedures that are impacted by cancelling of an uplink transmission are referred to herein as dependent procedures.

Techniques implemented in accordance with aspects of the present disclosure provide operation of dependent procedures configured for avoiding or mitigating one or more aspect of the impact on the dependent procedure of cancelling an uplink transmission. According to some aspects of the disclosure, one or more attributes (e.g., a transmission indication attribute) associated with a cancelled uplink transmission may be designated for operation of one or more dependent procedures. For example, an understanding of whether the cancelled uplink transmission is considered either as having been transmitted or not having been transmitted (e.g., as if the uplink transmission has never been requested) may be provided for dependent procedures. In accordance with some examples of the disclosure, a transmission indication attribute (e.g., one or more bits or values in a field designated for transmission indication in a cancelled transmission indication database providing associations between dependent procedures and transmission indication attributes) may be set or otherwise provided to designate that the cancelled uplink transmission is considered as having been transmitted or not having been transmitted.

The one or more attributes associated with a cancelled uplink transmission designated for operation of dependent procedures may, according to some aspects of the disclosure, be based upon or otherwise correspond to whether the cancelling the first uplink transmission is a fast cancellation or is a slow cancellation. Cancelling an uplink transmission may, for example, be determined to be a fast cancellation in situations where the cancellation does not meet one or more deadlines, schedules, chronologies, etc. (collectively referred to as timelines) or determined to be a slow cancellation in situations where the cancellation does meet the one or more timelines. For example, cancelling an uplink transmission may be considered as not meeting a timeline in a situation in which cancellation processing may not be completed prior to a time duration or terminating of one or more timelines. According to some examples of the disclosure, a first timeline (e.g., referred to as N1) may establish a minimum gap (e.g., in unit of OFDM symbols and/or a time duration). In some particular deployments, a minimum gap of a first timeline may span from a last OFDM symbol of PDSCH to a first OFDM symbol of hybrid automatic repeat request (HARQ) ACK transmission. A second timeline (e.g., referred to as N2) may establish a minimum gap (e.g., in unit of OFDM symbols and/or a time duration). In some particular deployments, a minimum gap of a second timeline may span from a last OFDM symbol of uplink downlink control information (DCI) to an OFDM symbol of PUSCH transmission. Use of varied timelines enables dynamic slow and fast cancellation features as may be desired for operations.

Transmissions may be classified as cancelled relative to one or more timelines or timing duration thresholds. For example, in accordance with some aspects of the disclosure, cancelling an uplink transmission may be determined to be fast cancellation. Sample fast cancellation scenarios can include situations where an uplink transmission is cancelled with insufficient time for cancellation processing by a communication device putatively transmitting the uplink transmission to meet N1 and/or N2 timelines (e.g., cancellation processing is not completed prior to the above mentioned N1 and/or N2 gaps terminating, wherein the communication device originally scheduled to transmit the uplink transmission is unaware of the cancellation prior to a time for transmitting the now cancelled uplink transmission). Additionally or alternatively, cancelling an uplink transmission may be determined to be a slow cancellation. Sample slow cancellation scenarios can include situations where the an uplink transmission is cancelled with sufficient time for cancellation processing by a communication device putatively transmitting the uplink transmission cancellation to meet N1 and/or N2 timelines (e.g., cancellation processing is completed prior to the above mentioned N1 and/or N2 gaps terminating, wherein the communication device originally scheduled to transmit the uplink transmission is aware of the cancellation prior to time for transmitting the now cancelled uplink transmission). The cancellation processing of a fast or slow cancellation may, for example, comprise the communication device putatively transmitting the uplink transmission determining that the uplink transmission is to be cancelled and performing one or more actions to implement the cancellation.

Figure 3:
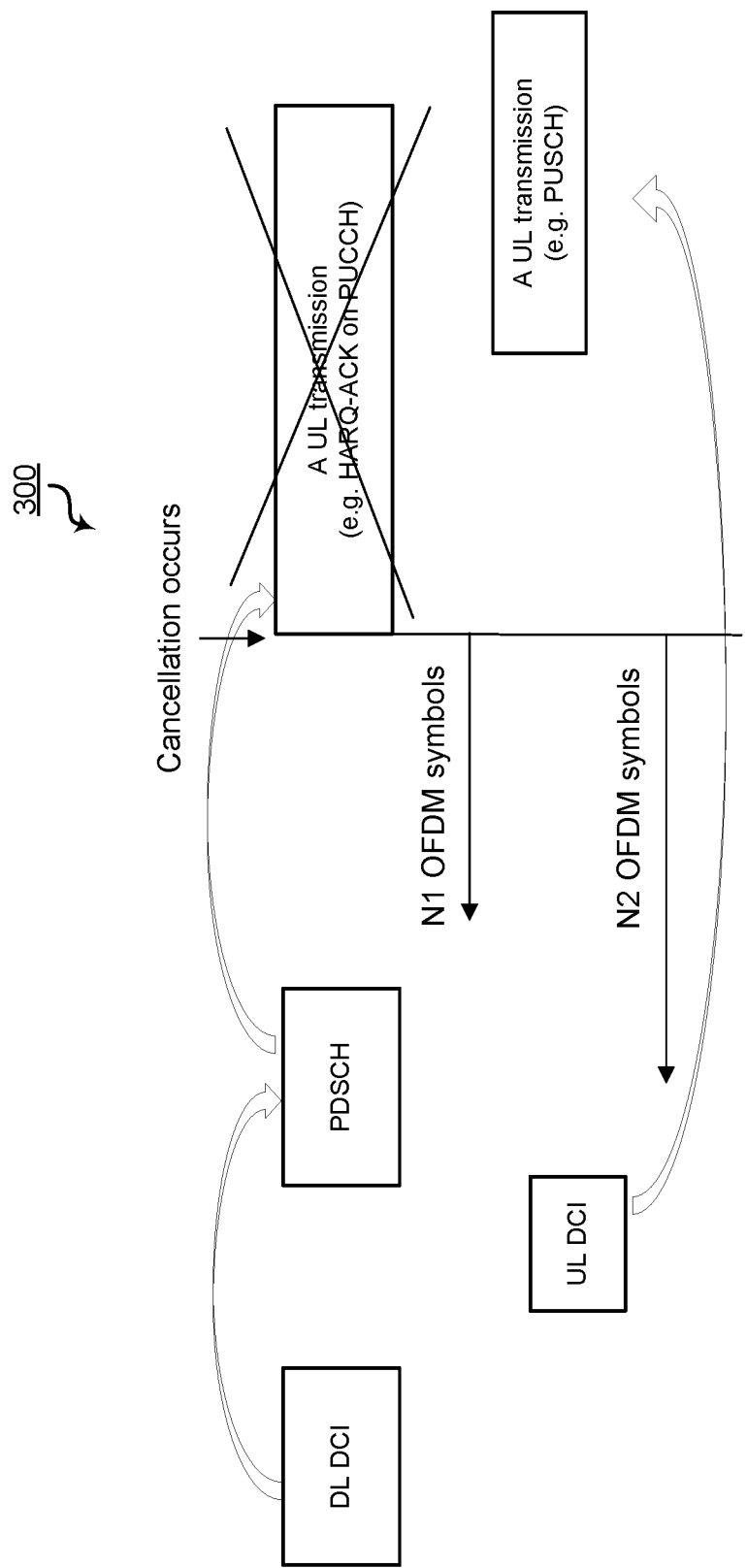
FIG. 3 is a graph illustrating an example of slow cancellation according to some aspects of the disclosure.
Figure 4:
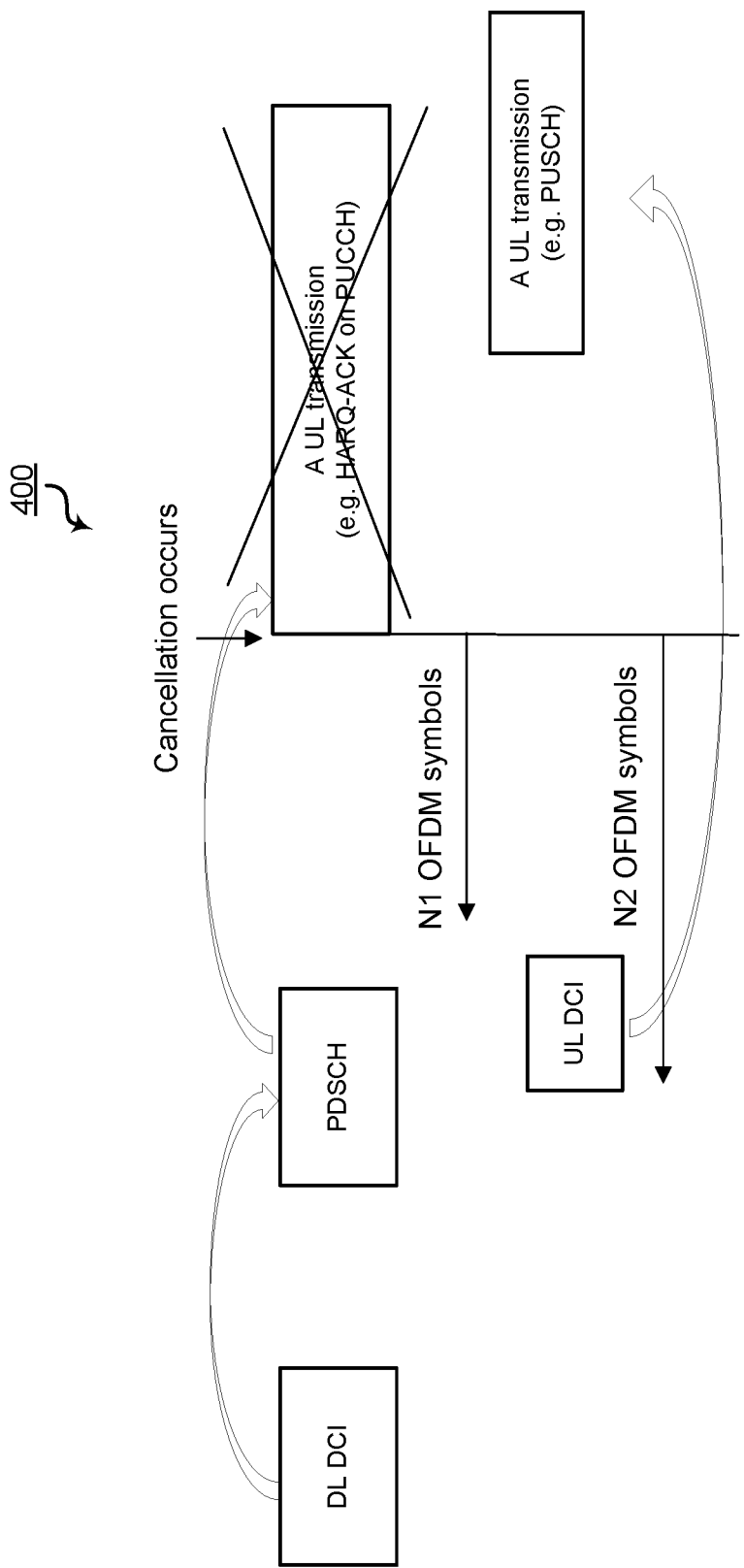
FIGS. 4 and 5 are graphs illustrating examples of fast cancellation according to some aspects of the disclosure.
Figure 5:
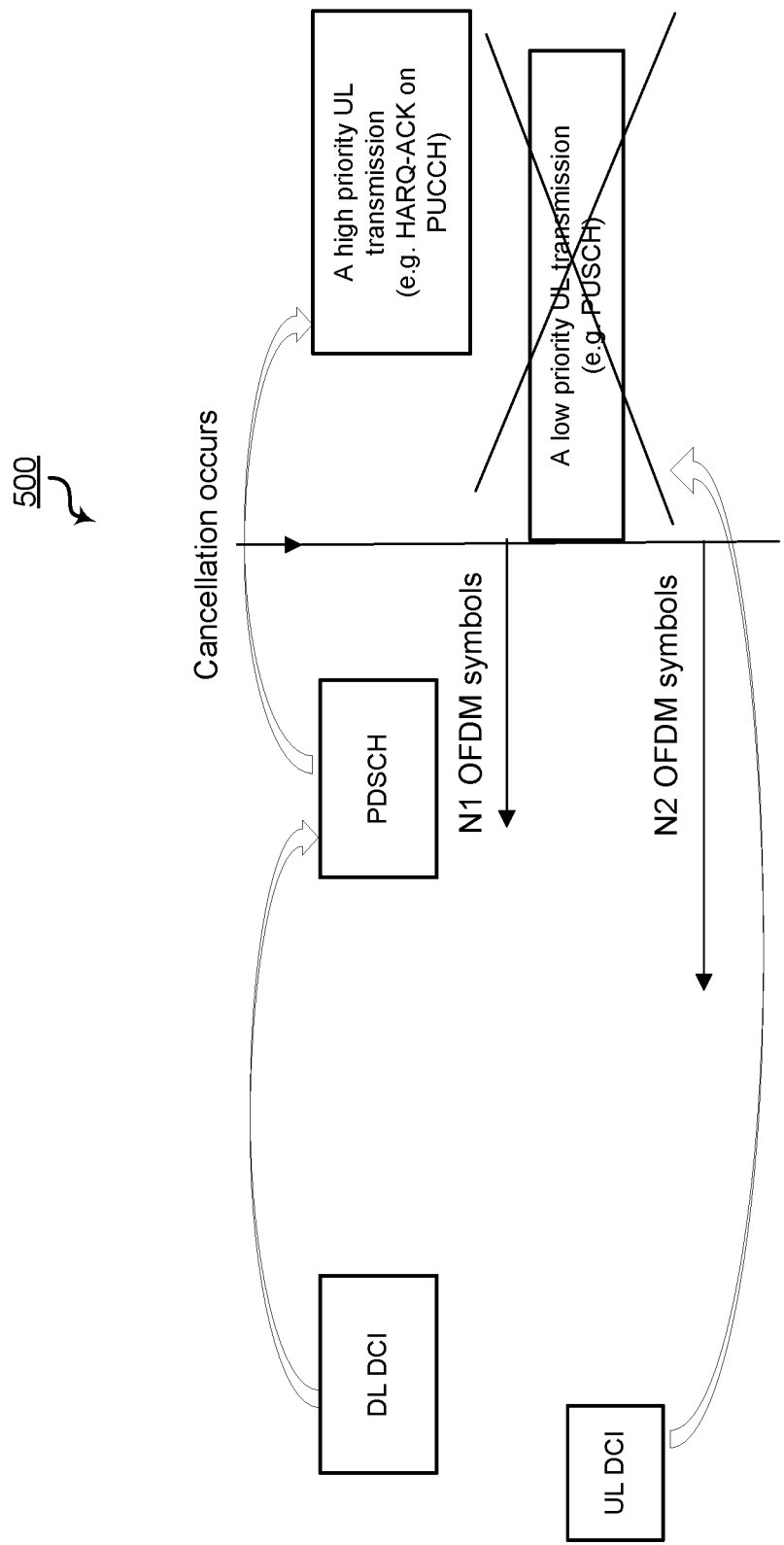

FIGS. 3-5 are diagrams illustrating examples of slow and fast cancellation according to some aspects. In particular, diagram 300 of FIG. 3 illustrates an example of slow cancellation, while diagrams 400 and 500 of FIGS. 4 and 5 illustrate examples of fast cancellation. Other cancellation operations are also possible.

Referring first to FIG. 3, operation resulting in cancelling an uplink transmission that may be determined to be a slow cancellation is illustrated with respect to a situation where the cancellation meets N1 and N2 timelines. As shown, a UE first received a downlink DCI scheduling a PDSCH with its HARQ-ACK transmission on PUCCH (e.g., DCI received via a downlink providing scheduling of downlink resources for PDSCH transmission and uplink resources for PUCCH for associated ACK/NACK transmission). Later, the UE received an uplink DCI scheduling a PUSCH (e.g., DCI received via a downlink providing scheduling of uplink resources for PUSCH transmission). In this example, the PUSCH will overlap with the PUCCH. Accordingly, the UE can "cancel" the PUCCH transmission, and multiplex payload of PUCCH on PUSCH and transmit them together. The cancellation of the uplink transmission in this example may be determined to be a slow cancellation. In particular, the event triggering the cancellation of the HARQ-ACK transmission (e.g., receiving the uplink DCI providing overlapping scheduling of resources for uplink transmission) occurs more than the N2 OFDM symbol gap time before the time where the cancellation physically happened (e.g., meets the N2 timeline). Moreover, the event related to the cancelled transmission (e.g., the PDSCH for which associated ACK/NACK transmission is scheduled via PUCCH) in this example, is received more than the N1 gap time before the cancellation physically happened (e.g., meets the N1 timeline). In this example, cancellation of the uplink transmission meets both the N1 and N2 timelines and may be determined to be a slow cancellation according to some aspects of the disclosure.

Operation resulting in cancelling an uplink transmission that may be determined to be a fast cancellation is illustrated in FIG. 4 with respect to a situation where the cancellation fails to meet a N2 timeline. As shown, a UE first received a downlink DCI scheduling a PDSCH with its HARQ-ACK transmission on PUCCH (e.g., DCI received via a downlink providing scheduling of downlink resources for PDSCH transmission and uplink resources for PUCCH for associated ACK/NACK transmission). Later, the UE received an uplink DCI scheduling a PUSCH (e.g., DCI received via a downlink providing scheduling of uplink resources for PUSCH transmission). In this example, the PUSCH overlap with the PUCCH. Accordingly, the UE can "cancel" the PUCCH transmission, and multiplex payload of PUCCH on PUSCH and transmit them together. The cancellation of the uplink transmission in this example may be determined to be a fast cancellation. In particular, the event triggering the cancellation of the HARQ-ACK transmission (e.g., receiving the uplink DCI providing overlapping scheduling of resources for uplink transmission), occurs less than the N2 OFDM symbol gap time before the time where the cancellation physically happened (e.g., fails to meet the N2 timeline).

FIG. 5 shows operation resulting in cancelling an uplink transmission that may be determined to be a fast cancellation with respect to a situation where the cancellation fails to meet a N1 timeline. As shown, a UE first received an uplink DCI scheduling a low priority PUSCH transmission (e.g., DCI received via a downlink providing scheduling of uplink resources for low priority PUSCH transmission). Low priority PUSCH transmission may, for example, comprise one or more transmissions for enhanced mobile broadband (eMBB). Later, the UE received a downlink DCI scheduling a high priority PDSCH (e.g., DCI received via a downlink providing scheduling of downlink resources for high priority PDSCH transmission and uplink resources for PUCCH for associated high priority ACK/NACK transmission). High priority PDSCH transmission may, for example, comprise one or more transmissions for ultra-reliable low-latency communication (URLLC). In this example, the high priority HARQ-ACK of the PDSCH (e.g., for URLLC) will overlap with the PUSCH (e.g., eMBB PUSCH). Accordingly, the UE can "cancel" the low priority PUSCH transmission and transmit the high priority HARQ-ACK. The cancellation of the uplink transmission in this example may be determined to be a fast cancellation. In particular, the event triggering the cancellation of the low priority PUSCH (e.g., the received downlink high priority PDSCH for which associated high priority ACK/NACK transmission is scheduled via PUCCH) occurs less than the N1 OFDM symbol gap time before the time where the cancellation physically happened (e.g., fails to meet the N1 timeline).

Cancellations may additionally and/or alternatively be determined based on or otherwise in correspondence with a variety of timing characteristics. Timing may include one or more varied time-based parameters (e.g., time periods, thresholds, and/or ranges, etc.) and/or portions of transmissions (e.g., number of symbols, resource elements, and./or blocks, etc.). In accordance with some aspects of the present disclosure, for a cancellation to be determined to be a slow cancellation, the cancellation meets both N1 and N2 timelines. For a cancellation to be determined to be a fast cancellation, the cancellation may fail to meet either or both N1 and N2 timelines.

Figure 6:
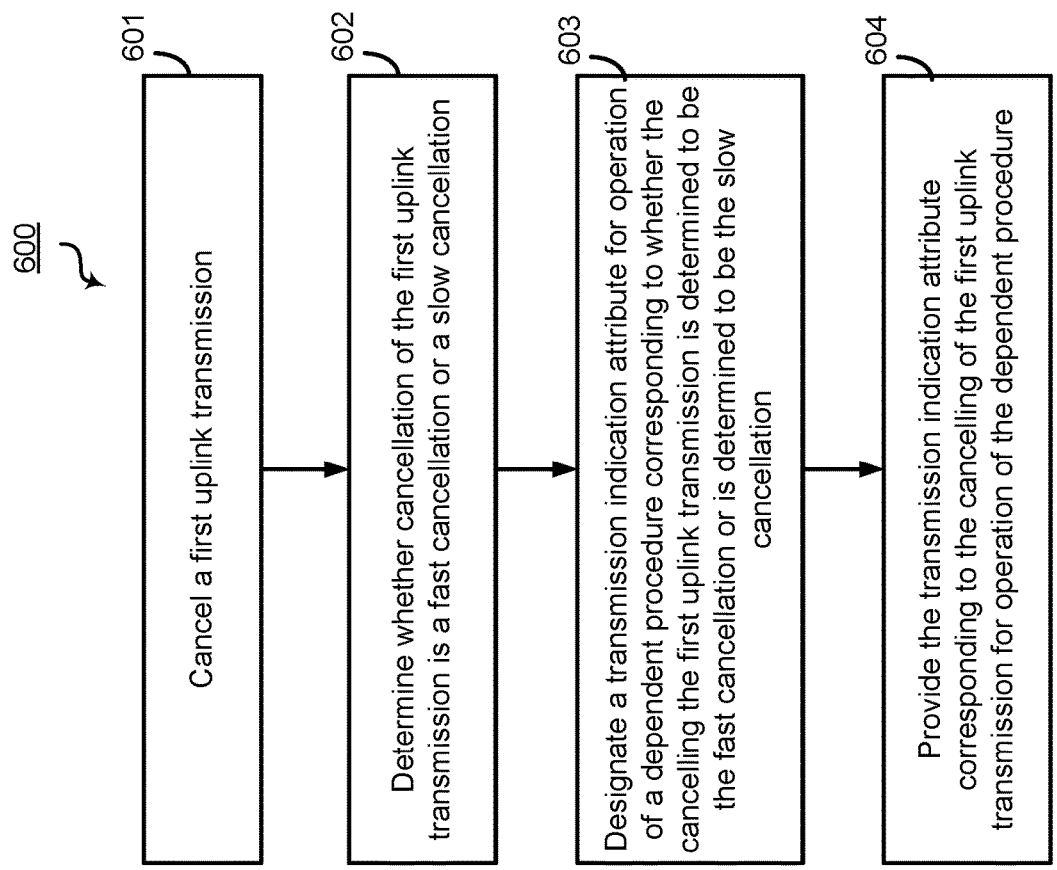
FIG. 6 is a flow diagram of example operation designating a transmission indication attribute with respect to dependent procedures and/or dependent procedure operations according to some embodiments of the present disclosure.

FIG. 6 shows operation according to a technique providing operation of dependent procedures configured for avoiding or mitigating one or more aspects of the impact on the dependent procedure of cancelling an uplink transmission according to some aspects of the disclosure. The functions of flow 600 of FIG. 6 may, for example, be implemented by cancelled transmission indication designation logic (e.g., one or more instruction set comprising executable program code) executed by one or more processors of a communication device putatively transmitting the uplink transmission. For example, in a situation where UE 115 is a communication device putatively transmitting a cancelled uplink transmission, controller/processor 280 and/or transmit processor 264 of UE 115 may implement cancelled transmission indication designation logic stored in memory 282 to perform functions of flow 600 shown in the example of FIG. 6.

A particular uplink transmission (referred to as a "first" uplink transmission) is cancelled at block 601 of the example of FIG. 6. In operation according to some examples of flow 600, cancellation of a first uplink transmission may comprise various forms of an abortive uplink transmission (e.g., a partially dropped transmission, a partially cancelled transmission, a fully dropped transmission, or a fully cancelled transmission). Cancellation of the first uplink transmission may, for example, be due to transmission prioritization, uplink skipping, scheduling cancellation, scheduling overlap, power limitation, measurement gap, conflict with a sidelink, etc. For example, a communication device (e.g., UE 115) may initially be scheduled to provide, or otherwise proceeding to make, the first uplink transmission when the uplink transmission is cancelled such that the first uplink transmission is not made (e.g., partially or fully dropped or cancelled). However, there may be one or more procedures being performed and/or subsequently to be performed by a communication device (e.g., UE 115) that are dependent on the first uplink transmission having been performed and operation according to flow 600 provides operation of dependent procedures configured for avoiding or mitigating one or more aspect of the impact on the dependent procedure of cancelling an uplink transmission.

At block 602 of flow 600, cancellation of a first uplink transmission may be determined to be a fast cancellation or a slow cancellation. In some instances, cancelled transmission indication designation logic executed by a device putatively transmitting the first uplink transmission may make this determination. Cancellation determinations (e.g., fast, slow, high priority, low priority, etc.) may depend on one more factors (e.g., time in general or relative to a threshold). For example, the cancellation of the first uplink transmission may be determined to be a fast cancellation if the first uplink transmission is cancelled with insufficient time for cancellation processing by a device putatively transmitting the first uplink transmission to meet one or more timelines (e.g., fails to meet N1 and/or N2 timelines). The cancellation of the first uplink transmission may be determined to be a slow cancellation if the first uplink transmission is cancelled with sufficient time for cancellation processing by a device putatively transmitting the first uplink transmission meeting one or more timelines (e.g., meets N1 and/or N2 timelines).

A first uplink transmission attribute for operation of a dependent procedure is designated at block 603 of flow 600 based upon or otherwise corresponding to whether the cancellation of the first uplink transmission is determined to be the fast cancellation or is determined to be the slow cancellation. In some instances, cancelled transmission indication designation logic executed by a device putatively transmitting the first uplink transmission may make this designation. The dependent procedure may, for example, be a procedure that is impacted by the cancellation of the first uplink transmission. In accordance with some aspects of the disclosure, the first uplink transmission attribute designated for the operation of the dependent procedure based upon or otherwise corresponding to whether the cancellation of the first uplink transmission is determined to be the fast cancellation or is determined to be the slow cancellation may comprise a transmission indication attribute. For example, the transmission indication attribute may indicate to the dependent procedure that the first uplink transmission is considered as transmitted or is considered as not transmitted. Accordingly, one or more attributes (e.g., a transmission indication attribute) associated with a cancelled uplink transmission may be designated for operation of the dependent procedure.

The designation of a transmission indication attribute for operation of a dependent procedure may correspond to the dependent procedure and/or its operation. For example, a transmission indication attribute may be designated for operation of a dependent procedure based upon or otherwise correspond to the procedure providing information reporting, monitoring, updating, etc., performing calculations, triggering a timer, and/or other functionality. Additionally or alternatively, a transmission indication attribute may be designated for one or more particular dependent procedures. Specific examples of transmission indication attribute designations with respect to various dependent procedures are given below. Such transmission indication attribute designations may, for example, be selected from a cancelled transmission indication database by cancelled transmission indication designation logic for corresponding dependent procedures and/or their operation. In accordance with some aspects of the disclosure, cancelled transmission indication designation logic may determine cancellation of an uplink transmission to be a fast cancellation or a slow cancellation, identify one or more dependent procedure impacted by the uplink transmission cancellation, and designate transmission indication attributes for the one or more dependent procedures according to associations between dependent procedures and transmission indication attributes in a cancelled transmission indication database.

A dependent procedure may, for example, comprise a transmission power control (TPC) accumulation procedure, wherein TPC is the power control command for uplink transmission. In accordance with some aspects of the disclosure, the transmission indication attribute may indicate for a TCP accumulation procedure that the first uplink transmission is considered as transmitted when the first uplink transmission is determined to be a fast cancellation. Additionally or alternatively, the transmission indication attribute may indicate for a TCP accumulation procedure that the first uplink transmission is considered as transmitted when the first uplink transmission is determined to be a slow cancellation. For a cancelled uplink transmission, considering the transmission as transmitted according to some examples may mean, from power control command accumulation for future uplink transmission point of view, UE accumulate the power control command in the DCI scheduling the cancelled transmission, as if the transmission occurred.

A dependent procedure may comprise a component carrier (CC) power scaling procedure. For example, in the case of uplink carrier aggregation, a UE's total uplink power is captured. If the total power sum up over all CCs exceeds the UE power limit, a power scaling down is performed at the UE. If, however, a UL transmission is cancelled, that may impact the power scaling of other uplink transmissions. In accordance with some aspects of the disclosure, the transmission indication attribute may indicate for a CC power scaling procedure that the first uplink transmission is considered as transmitted when the first uplink transmission is determined to be a fast cancellation. Considering the transmission as transmitted according to some examples may mean, when scaling the power of other uplink transmission, this cancelled transmission is considered transmitted. Additionally or alternatively, the transmission indication attribute may indicate for a CC power scaling procedure that the first uplink transmission is considered as not transmitted when the first uplink transmission is determined to be a slow cancellation. Considering the transmission as not transmitted according to some examples may mean, when scaling the power of other uplink transmissions, this cancelled transmission is not considered transmitted.

A dependent procedure may comprise CC maximum power reduction (MPR) procedure. For example, in the case of uplink carrier aggregation, the MPR value may depend on how many CCs have simultaneous uplink transmissions. If a UL transmission is cancelled, that may impact the MPR value. In accordance with some aspects of the disclosure, the transmission indication attribute may indicate for the CC MPR procedure that the first uplink transmission is considered as transmitted when the first uplink transmission is determined to be a fast cancellation. Considering the transmission as transmitted according to some examples may mean a UE determines the MPR for other uplink transmissions as if the dropped uplink transmission is transmitting. Additionally or alternatively, the transmission indication attribute may indicate for a CC MPR procedure that the first uplink transmission is considered as not transmitted when the first uplink transmission is determined to be a slow cancellation. Considering the transmission as not transmitted according to some examples may mean a UE determines the MPR for other uplink transmissions by treating the dropped uplink transmission is dropped.

A dependent procedure may comprise a half duplex handling procedure. There is a set of rules set forth in the 3GPP Release 15 standards (TS 38.214 V 15.8.0 section 5.1, incorporated herein by reference) for the case where the UE is not capable of receiving in a TDD band while transmitting in another TDD band, wherein a case when an uplink transmission would be prioritized over simultaneous downlink receiving is supported. However, nothing provides for how a UE should react with respect to other downlink/uplink transmissions when an uplink transmission is cancelled. In accordance with some aspects of the disclosure, the transmission indication attribute may indicate for a half duplex handling procedure that the first uplink transmission is considered as transmitted when the first uplink transmission is determined to be a fast cancellation. Considering the transmission as transmitted according to some examples may mean other downlink/uplink transmissions assume the cancelled uplink transmission is transmitted when applying prioritization rules (e.g., a 3GPP Release 15 prioritization rule). Additionally or alternatively, the transmission indication attribute may indicate for a half duplex handling procedure that the first uplink transmission is considered as not transmitted when the first uplink transmission is determined to be a slow cancellation. Considering the transmission as not transmitted according to some examples may mean other downlink/uplink transmissions assume the cancelled uplink transmission is not transmitted when applying prioritization rules (e.g., a 3GPP Release 15 prioritization rule).

A dependent procedure may comprise a new data indicator (NDI) interpretation procedure. For example, in uplink DCI scheduling PUSCH transmission, there is a NDI field. If NDI is toggled with respect to NDI in previous uplink DCI for the same HARQ process to indicate this scheduled PUSCH is for new data transmission (e.g., the UE should put new medium access control (MAC) layer packet data unit (PDU) in the PUSCH). If NDI is not toggled with respect to NDI in previous uplink DCI for the same HARQ process, this scheduled PUSCH is for retransmission (e.g., the UE should retransmit the previous MAC PDU). However, if a dropped PUSCH had a flipped NDI, it may be unclear as to whether the NDI for the next PUSCH transmission NDI is compared to the dropped one or not. In accordance with some aspects of the disclosure, the transmission indication attribute may indicate for the NDI interpretation procedure that the first uplink transmission is considered as transmitted when the first uplink transmission is determined to be a fast cancellation. Additionally or alternatively, the transmission indication attribute may indicate for the NDI interpretation procedure that the first uplink transmission is considered as transmitted when the first uplink transmission is determined to be a slow cancellation. Considering the transmission as transmitted according to some examples may mean the UE is to treat this NDI of the cancelled PUSCH as if the cancelled PUSCH is transmitted. However, considering the transmission as not made may mean the UE is to treat this NDI of cancelled PUSCH as if the cancelled PUSCH is not transmitted.

A dependent procedure may comprise a power headroom report (PHR) in re-transmission procedure. If a PUSCH carrying PHR is dropped, later in the retransmission of the PUSCH, it may be unclear whether the UE should consider this retransmission is retransmission of the previous PUSCH carrying the PHR or not. In accordance with some aspects of the disclosure, the transmission indication attribute may indicate for a PHR in re-transmission procedure that the first uplink transmission is considered as transmitted when the first uplink transmission is determined to be a fast cancellation. Additionally or alternatively, the transmission indication attribute may indicate for a PHR in re-transmission procedure that the first uplink transmission is considered as transmitted when the first uplink transmission is determined to be a slow cancellation. Considering the transmission as transmitted according to some examples may mean that the UE considers this retransmission is retransmission of the previous PUSCH carrying the PHR (e.g., yes, the retransmitted PUSCH is carrying the old PHR). However, considering the transmission as not transmitted according to some examples may mean that the UE considers this retransmission is not retransmission of the previous PUSCH carrying the PHR (e.g., no, the retransmitted PUSCH is carrying a newly generated PHR).

A dependent procedure may comprise a HARQ out-of-order procedure. For example, in 5G NR, the uplink DCI and scheduled PUSCH is pipelined in order (e.g., if uplink DCI A is received at slot T, schedule uplink PUSCH A for transmitting at slot T+X, wherein the UE cannot receive another uplink DCI B after slot T which would schedule another uplink PUSCH B for transmitting before slot T+X, although PUSCH B transmitting after T+X is fine). This is called the uplink out-of-order constraint. There is a similar downlink out-of-order constraint between PDSCH and its HARQ-ACK feedback. If an uplink transmission is cancelled due to some reason, it may be unclear whether remaining uplink transmissions will treat this uplink transmission as transmitted or not when evaluating this out-of-order restriction. In accordance with some aspects of the disclosure, the transmission indication attribute may indicate for a HARQ out-of-order procedure that the first uplink transmission is considered as transmitted when the first uplink transmission is determined to be a fast cancellation. Additionally or alternatively, the transmission indication attribute may indicate for a HARQ out-of-order procedure that the first uplink transmission is considered as transmitted when the first uplink transmission is determined to be a slow cancellation. Considering the transmission as transmitted according to some examples may mean that remaining uplink transmissions will treat this uplink transmission as transmitted (e.g., yes, treat the uplink transmission as transmitted when evaluating an out-of-order restriction). However, considering the transmission has not transmitted according to some examples may mean that remaining uplink transmissions will treat this uplink transmission as not having been transmitted (e.g., no, do not treat the uplink transmission as transmitted when evaluating an out-of-order restriction).

A dependent procedure may comprise a carrier aggregation (CA) based secondary reference signal (SRS) switching preemption procedure. For example, when SRS is transmitted, the uplink transmission on another CC may be stopped. According to prioritization rules, when that other CC would be transmitting PUCCH or uplink control information (UCI) on PUSCH then the SRS may not be transmitted and the PUCCH/PUSCH may be transmitted instead. However, it may be unclear whether the same is done even if the PUCCH/PUSCH is dropped for some other reason. In accordance with some aspects of the disclosure, the transmission indication attribute may indicate for a CA based SRS switching preemption procedure that the first uplink transmission is considered as transmitted when the first uplink transmission is determined to be a fast cancellation. Considering the transmission as transmitted according to some examples may mean that a CC may transmit PUCCH or UCI on PUSCH (e.g., yes, the SRS may not be transmitted and the PUCCH/PUSCH may be transmitted instead) Additionally or alternatively, the transmission indication attribute may indicate for a CA based SRS switching preemption procedure that the first uplink transmission is considered as not transmitted when the first uplink transmission is determined to be a slow cancellation. Considering the transmission as having not been made according to some examples may mean that the SRS may be transmitted (e.g., no, the PUCCH/PUSCH may not be transmitted instead of the SRS).

A dependent procedure may comprise a SRS for non-codebook based procedure. For example, for non-codebook based PUSCH, a UE may transmit some precoded SRS to facilitate a base station picking the rank and ports for scheduled PUSCH. However, when the SRS is dropped due to some reason, from other uplink transmission perspective, it may be unclear whether the UE assumes the SRS is transmitted or not. In accordance with some aspects of the disclosure, the transmission indication attribute may indicate for a SRS for non-codebook based procedure that the first uplink transmission is considered as transmitted when the first uplink transmission is determined to be a fast cancellation. Additionally or alternatively, the transmission indication attribute may indicate for a SRS for non-codebook based procedure that the first uplink transmission is considered as not transmitted when the first uplink transmission is determined to be a slow cancellation. Considering the transmission as not transmitted according to some examples may mean that the UE does not assume that the SRS is transmitted (e.g., no, when considering another uplink transmission, the SRS has not been transmitted). However, considering the transmission as transmitted according to some examples may mean that the UE does assume that the SRS is transmitted (e.g., yes, when considering another uplink transmission, the SRS has been transmitted).

A dependent procedure may comprise an interpretation of reserved modulation coding scheme (MCS) procedure. For example, for uplink PUSCH retransmission, a base station may indicate reserved MCS to indicate the modulation order for retransmission, with the assumption that the transport block (TB) size for retransmission is to be the same as the original transmission. However, if the original transmission is cancelled, it may be unclear as to how the UE should interpret the reserved MCS for the retransmission. In accordance with some aspects of the disclosure, the transmission indication attribute may indicate for an interpretation of reserved MCS procedure that the first uplink transmission is considered as transmitted when the first uplink transmission is determined to be a fast cancellation. Additionally or alternatively, the transmission indication attribute may indicate for an interpretation of reserved MCS procedure that the first uplink transmission is considered as transmitted when the first uplink transmission is determined to be a slow cancellation. Considering the transmission as transmitted according to some examples may mean that the UE treats the cancelled original transmission as if it is transmitted for interpreting the reserved MCS for retransmission. However, considering the transmission as not transmitted according to some examples may mean that the UE treats the cancelled original transmission as if it was not transmitted for interpreting the reserved MCS for retransmission.

A dependent procedure may comprise an uplink (UL) transmit switching state procedure. For example, in uplink TDD and FDD carrier aggregation, a UE may have only 2 physical transmit antennas but needs to support in total 3 layers of uplink transmission (e.g., one layer on FDD carrier and 2 layers on TDD carrier). Several states are defined in the 3GPP standard (TS 38.214 V. 16.5.0 section 6.1.6.2, incorporated herein by reference) for UEs that cannot transmit 3 layers simultaneous. For each such state, the two physical transmit antennas are assigned to different layers (e.g., state 1="1 layer on FDD+1 layer on TDD", state 2="1 layer on FDD+0 layer on TDD", state 3="0 layer on FDD, 2 layers on TDD", state 4="0 layer on FDD, 1 layer on TDD"), wherein a UE can transit among these different states. However, if a UE needs to transit from state A to state B, but a transmission is cancelled either in state A or state B, it may be unclear whether the UE changes its state transition. For example, if a UE transits from A to B, but one transmission is dropped in B, which turns state B into B', it may be unclear whether the UE assumes it transits from A to B, or the UE assumes it transits from A to B'. Further, if a UE transits from A to B, but one transmission is dropped in A, which turns state A into A', it may be unclear whether the UE assumes it transits from A to B, or the UE assumes it transits from A' to B. In accordance with some aspects of the disclosure, the transmission indication attribute may indicate for a UL transmit switching state procedure that the first uplink transmission is considered as transmitted when the first uplink transmission is determined to be a fast cancellation. Considering the transmission as transmitted according to some examples may mean that a UE does state transition as if nothing is dropped in states A and B. Additionally or alternatively, the transmission indication attribute may indicate for a UL transmit switching state procedure that the first uplink transmission is considered as not transmitted when the first uplink transmission is determined to be a slow cancellation. Considering the transmission as not having been made according to some examples may mean that a UE does the state transition considering the dropped transmission is not transmitted.

A dependent procedure may comprise a determination of duplex direction procedure. It may be unclear what the duplex direction will be when an uplink transmission (semi-static or dynamic) would change an OFDM symbol from X to U but that uplink transmission is cancelled. In accordance with some aspects of the disclosure, the transmission indication attribute may indicate for a determination of duplex direction procedure that the first uplink transmission is considered as transmitted when the first uplink transmission is determined to be a fast cancellation. Considering the transmission as transmitted according to some examples may mean a UE assumes the OFDM symbol X is turned into U, although the uplink transmission is cancelled. Additionally or alternatively, the transmission indication attribute may indicate for a determination of duplex direction procedure that the first uplink transmission is considered as not transmitted when the first uplink transmission is determined to be a slow cancellation. Considering the transmission as not transmitted according some examples may mean a UE assumes the OFDM symbol X stays as X, because the uplink transmission is cancelled.

A dependent procedure may comprise a SRS codebook based procedure. For example, for codebook based PUSCH, a UE may transmit some SRS to facilitate a base station picking the rank and precoder for scheduled PUSCH. However, when the SRS is dropped due to some reason, from other uplink transmission perspective, it may be unclear whether the UE assumes the SRS is transmitted or not. In accordance with some aspects of the disclosure, the transmission indication attribute may indicate that the first uplink transmission is considered as transmitted when the first uplink transmission is determined to be a fast cancellation. Additionally or alternatively, the transmission indication attribute may indicate that the first uplink transmission is considered as not transmitted when the first uplink transmission is determined to be a slow cancellation. Considering the transmission as not having been made according to some examples may mean that a UE does not assume that the SRS is transmitted with respect to another uplink transmission. However, considering the transmission as transmitted according to some examples may meant that a UE does assume that the SRS is transmitted with respect to another uplink transmission.

A dependent procedure may comprise a counting of active channel state indicator (CSI) resources procedure. For example, for aperiodic CSI on PUSCH, if the PUSCH is cancelled, it may be unclear whether a UE assumes the active CSI-RS resources for the report are released or not. In accordance with some aspects of the disclosure, the transmission indication attribute may indicate for a counting of active CSI resources procedure that the first uplink transmission is considered as transmitted when the first uplink transmission is determined to be a fast cancellation. Additionally or alternatively, the transmission indication attribute may indicate for a counting of active CSI resources procedure that the first uplink transmission is considered as transmitted when the first uplink transmission is determined to be a slow cancellation. Considering the transmission as transmitted according to some examples may mean a UE assumes the active CSI-RS resources for the report are released (e.g., yes, the CSI-RS resources are released). However, considering the transmission as not transmitted according to some examples may mean a UE assumes the active CSI-RS resources for the report are not released (e.g., no, the CSI-RS resources are not released).

A dependent procedure may comprise a MAC control element (CE) action time procedure. For example, after a UE receives a MAC-CE, the action indicated in the MAC-CE becomes effective 3 ms after the UE sends ACK for the successful MAC-CE reception. However, if the ACK for the MAC-CE is dropped due to some reason, it may be unclear whether a UE assumes the action indicated in the MAC-CE becomes effective 3 ms after the time ACK transmission would happen before dropping. In accordance with some aspects of the disclosure, the transmission indication attribute may indicate for a MAC CE action time procedure that the first uplink transmission is considered as transmitted when the first uplink transmission is determined to be a fast cancellation. Additionally or alternatively, the transmission indication attribute may indicate for a MAC CE action time procedure that the first uplink transmission is considered as transmitted when the first uplink transmission is determined to be a slow cancellation. Considering the transmission as transmitted according to some examples may mean a UE assumes the action indicated in the MAC-CE becomes effective 3 ms after the time ACK transmission would happen before dropping. However, considering the transmission as not transmitted according to some examples may mean a UE assumes the action indicated in the MAC-CE does not become effective 3 ms after the time ACK transmission would happen before dropping.

A dependent procedure may comprise a buffer state report (BSR) procedure. For example, a UE may send BSR MAC CE to a base station to report the size of its buffered data. In accordance with some aspects of the disclosure, the transmission indication attribute may indicate for a BSR procedure that the first uplink transmission is considered as transmitted when the first uplink transmission is determined to be a fast cancellation. Considering the transmission as transmitted according to some examples may mean a UE retransmits the old BSR when the UE gets a chance to transmit the BSR later (e.g., even if additional new data arrives between the two transmissions). Additionally or alternatively, the transmission indication attribute may indicate for a BSR procedure that the first uplink transmission is considered as not transmitted when the first uplink transmission is determined to be a slow cancellation. Considering the transmission as not transmitted according to some examples may mean a UE generates a new/updated BSR when the UE gets a chance to transmit the BSR later.

A dependent procedure may comprise a round trip time (RTT) timer procedure. For example, a UE may start a HARQ RTT timer after it transmits a TB on PUSCH. After the RTT timer expires, the UE may start a retransmission timer and monitor PDCCH for potential retransmission request from network. In accordance with some aspects of the disclosure, the transmission indication attribute may indicate for a RTT timer procedure that the first uplink transmission is considered as transmitted when the first uplink transmission is determined to be a fast cancellation. Additionally or alternatively, the transmission indication attribute may indicate for a RTT timer procedure that the first uplink transmission is considered as not transmitted when the first uplink transmission is determined to be a slow cancellation. Considering the transmission as not transmitted according to some examples may mean a UE does not start a RTT timer if an uplink transmission on PUSCH is cancelled. However, considering the transmission as transmitted according to some examples may mean a UE starts a RTT timer if an uplink transmission on PUSCH is cancelled.

A dependent procedure may comprise a HARQ attempt count procedure. In accordance with some aspects of the disclosure, the transmission indication attribute may indicate for a HARQ attempt count procedure that the first uplink transmission is considered as transmitted when the first uplink transmission is determined to be a fast cancellation. Considering the transmission as transmitted according to some examples may mean a HARQ attempt count is incremented (e.g., HARQ attempt count+1). Additionally or alternatively, the transmission indication attribute may indicate for a HARQ attempt count procedure that the first uplink transmission is considered as not transmitted when the first uplink transmission is determined to be a slow cancellation. Considering the transmission as not transmitted according to some examples may mean a HARQ attempt count stays the same.

A dependent procedure may comprise a PHR calculation procedure. For example, values and types of PHR information reported by UEs may depend on whether there is a PUSCH transmission on a carrier. In an uplink carrier aggregation configuration, a UE may be provided with multiple uplink grants in the same slot. Some of these uplink grants may be canceled or skipped (e.g. the UE may not have as much data to send as estimated by the network), and multiple PUSCH may be scheduled but some of them are cancelled or skipped. It may be, however, unclear whether the PHR should include the cancelled PUSCH or not. In accordance with some aspects of the disclosure, the transmission indication attribute may indicate for a PHR calculation procedure that the first uplink transmission is considered as transmitted when the first uplink transmission is determined to be a fast cancellation. Considering the transmission as transmitted according to some examples may mean that, even if PUSCH transmission on a carrier is cancelled or skipped, a UE reports real PHR information for that carrier to the network as if the PUSCH transmission did happen. Additionally or alternatively, the transmission indication attribute may indicate for a PHR calculation procedure that the first uplink transmission is considered as not transmitted when the first uplink transmission is determined to be a slow cancellation. Considering the transmission as not transmitted according to some examples may mean a UE reports values and types of PHR information to the network according to the actual PUSCH transmission (e.g., if there is no PUSCH transmission on a carrier, then a UE reports virtual PHR to network; otherwise, a UE reports real PHR information to network).

The above examples of transmission indication attribute designations with respect to various dependent procedures are represented in the table below. Generally, the transmission indication attribute designation "T" indicates whether a cancelled uplink transmission is to be considered as transmitted. And the transmission indication attribute designation "N" indicates whether a cancelled uplink transmission is to be considered as not transmitted. The table below may, for example, represent contents of a cancelled transmission indication database providing associations between dependent procedures and transmission indication attributes according to some aspects of the present disclosure.

| Procedure | Fast Cancel | Slow Cancel |
| --- | --- | --- |
| TPC accumulation | T | T |
| Power scaling on other CCs | T | N |
| MPR on other CCs (e.g. intra-band) | T | N |
| Half duplex handling | T | N |
| NDI interpretation | T | T |
| PHR in re-Tx | T | T |
| HARQ out-of-order | T | T |
| CA-based SRS switching preemption | T | N |
| SRS for non-codebook based | N | N |
| Interpretation of reserved MCS | T | T |
| UL Tx switching state | T | N |
| Determination of duplex direction | T | N |
| SRS for codebook based | N | N |
| Counting of active CSI resources | T | T |
| MAC CE action time | T | T |
| BSR | T | N |
| RTT timer | N | N |
| HARQ attempt count | T | N |
| PHR calculation | T | N |

As described above, the transmission indication attribute may indicate to the dependent procedure that the first uplink transmission is considered as transmitted or is considered as not transmitted. Accordingly, at block 604 of the illustrated example of flow 600, the transmission indication attribute corresponding to the cancelling of the first uplink transmission is provided for operation of the dependent procedure. For example, cancelled transmission indication designation logic of a communication device putatively transmitting the cancelled first uplink transmission may provide the transmission indication attribute to one or more procedures (e.g., one or more procedures of the foregoing examples), directly or indirectly (e.g., through an operating system, an application program interface (API), a register, etc.) for use in subsequent operation by the procedure(s). In accordance with some examples of the disclosure, the transmission indication attribute indicates to a dependent procedure that the first uplink transmission is considered as transmitted or is considered as not transmitted in correspondence with the cancellation of the first uplink transmission being a fast cancellation or a slow cancellation. The dependent procedure may comprise one or more procedures that are impacted by the cancellation of the first uplink transmission.

Figure 7:
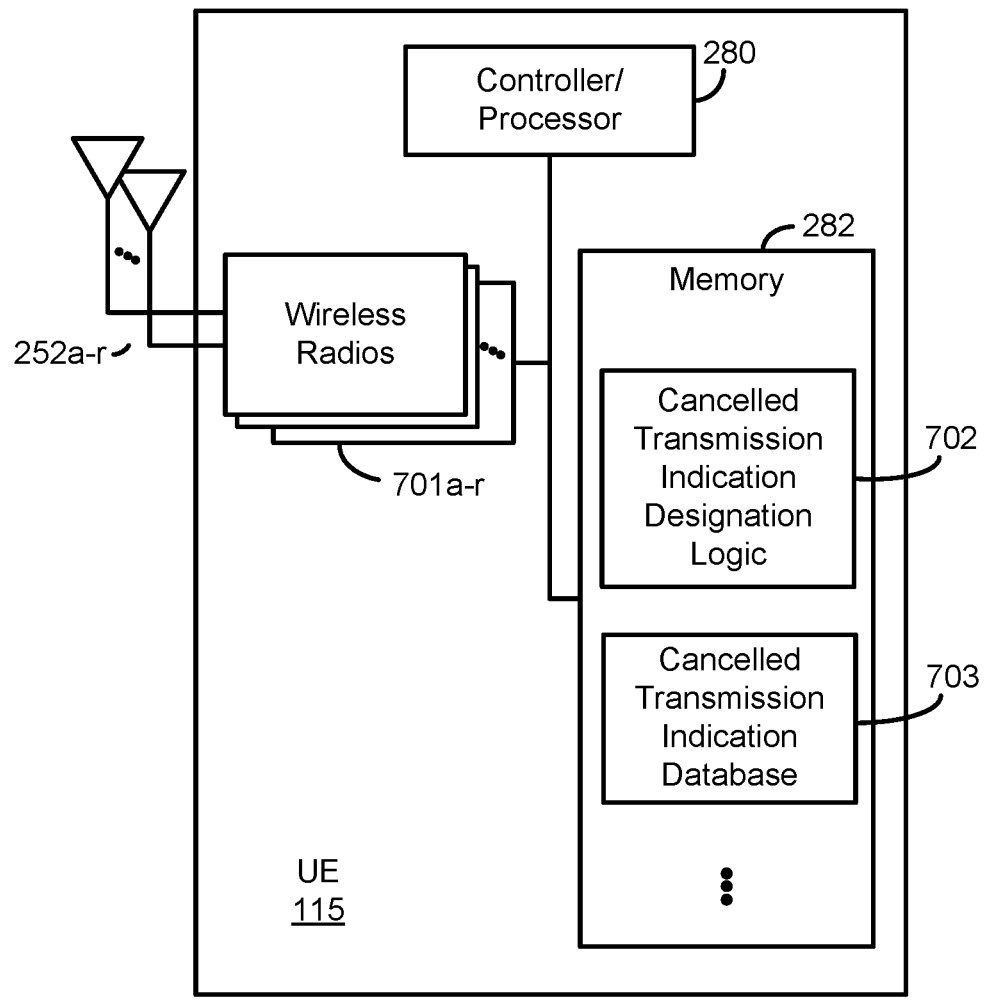
FIG. 7 is a block diagram conceptually illustrating a design of a UE configured to designate a transmission indication attribute with respect to dependent procedures and/or dependent procedure operations according to some embodiments of the present disclosure.

FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r include various components and hardware, as illustrated in FIG. 2 for UE 115, including modulator/demodulators 254a-r, MIMO detector 256, receive processor 258, transmit processor 264, and TX MIMO processor 266.

UE 115 of the example shown in FIG. 7 includes cancelled transmission indication designation logic 702 and cancelled transmission indication database 703, which may be utilized for performing functions as described herein with respect to providing operation of dependent procedures configured for avoiding or mitigating one or more aspect of the impact on the dependent procedure of cancelling an uplink transmission according to some aspects of the present disclosure. Cancelled transmission indication designation logic 702 may, for example, comprise program code stored in memory 282 that is executed by controller/processor 280 for providing respective functionality. Cancelled transmission indication designation logic 702 may be configured for facilitating operation for cancelling an uplink transmission, determining cancellation of the uplink transmission to be fast cancellation or slow cancellation, designating an uplink transmission attribute for operation of dependent procedures based upon or otherwise corresponding to whether the cancellation of the uplink transmission is determined to be fast cancellation or is determined to be slow cancellation, and/or providing the transmission attribute for operation of dependent procedures. Cancelled transmission indication designation logic 702 may access or otherwise reference data of cancelled transmission indication database 703 for designating a transmission indication attribute with respect to dependent procedures and/or operation of dependent procedures.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to designating a transmission indication attribute with respect to dependent procedures and/or operation of dependent procedures may be implemented via specialized processor circuitry, via executable instructions, and/or combinations thereof.

In some examples of methods, the apparatuses, and articles including non-transitory computer-readable medium described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for cancelling a first uplink transmission, wherein the cancelling the first uplink transmission is a fast cancellation if the first uplink transmission is cancelled with insufficient time for a device transmitting the first uplink transmission to meet a first one or more timelines of a plurality of timelines, and wherein the cancelling the first uplink transmission is a slow cancellation if the first uplink transmission is cancelled with sufficient time for the device transmitting the first uplink transmission to meet a second one or more timelines of the plurality of timelines, and providing a transmission indication attribute corresponding to the cancelling the first uplink transmission for operation of a dependent procedure, wherein the transmission indication attribute indicates to the dependent procedure that the first uplink transmission is considered as transmitted or is considered as not transmitted in correspondence with the cancelling the first uplink transmission being the fast cancellation or the slow cancellation.

2. The methods, apparatuses, and articles of clause 1, wherein the cancelling the first uplink transmission includes an abortive uplink transmission selected from the group consisting of partially dropped transmission, partially cancelled transmission, fully dropped transmission, and fully cancelled transmission.

3. The methods, apparatuses, and articles of any of clauses 1-2, wherein the cancelling the first uplink transmission is due to at least one of transmission prioritization, uplink skipping, scheduling cancellation, scheduling overlap, power limitation, measurement gap, or conflict with a sidelink.

4. The methods, apparatuses, and articles of any of clauses 1-3, further providing for configuring the plurality of timelines to indicate at least one of a N1 timeline establishing a first minimum gap from a last OFDM symbol of a PDSCH to a first OFDM symbol of HARQ ACK transmission or a N2 timeline establishing a second minimum gap from a last OFDM symbol of uplink DCI to an OFDM symbol of a PUSCH transmission.

5. The methods, apparatuses, and articles of clause 4, wherein the first one or more timelines include the N2 timeline establishing a minimum gap from a last OFDM symbol of uplink DCI to an OFDM symbol of a PUSCH transmission.

6. The methods, apparatuses, and articles of any of clauses 4-5, wherein the second one or more timelines include the N1 timeline establishing a minimum gap from a last OFDM symbol of a PDSCH to a first OFDM symbol of HARQ ACK transmission and the N2 timeline establishing a minimum gap from a last OFDM symbol of uplink DCI to an OFDM symbol of a PUSCH transmission.

7. The methods, apparatuses, and articles of any of clauses 1-6, wherein the dependent procedure comprises a TPC accumulation procedure, and wherein the transmission indication attribute indicates that the first uplink transmission is considered as transmitted when the first uplink transmission is determined to be the fast cancellation.

8. The methods, apparatuses, and articles of any of clauses 1-7, wherein the dependent procedure comprises a TPC accumulation procedure, and wherein the transmission indication attribute indicates that the first uplink transmission is considered as transmitted when the first uplink transmission is determined to be the slow cancellation.

9. The methods, apparatuses, and articles of any of clauses 1-8, wherein the dependent procedure comprises a CC power scaling procedure, and wherein the transmission indication attribute indicates that the first uplink transmission is considered as transmitted when the first uplink transmission is determined to be the fast cancellation.

10. The methods, apparatuses, and articles of any of clauses 1-9, wherein the dependent procedure comprises a CC power scaling procedure, and wherein the transmission indication attribute indicates that the first uplink transmission is considered as transmitted when the first uplink transmission is determined to be the slow cancellation.

11. The methods, apparatuses, and articles of any of clauses 1-10, wherein the dependent procedure comprises a CC MPR procedure, and wherein the transmission indication attribute indicates that the first uplink transmission is considered as transmitted when the first uplink transmission is determined to be the fast cancellation.

12. The methods, apparatuses, and articles of any of clauses 1-11, wherein the dependent procedure comprises a CC MPR procedure, and wherein the transmission indication attribute indicates that the first uplink transmission is considered as not transmitted when the first uplink transmission is determined to be the slow cancellation.

13. The methods, apparatuses, and articles of any of clauses 1-12, wherein the dependent procedure comprises a half duplex handling procedure, and wherein the transmission indication attribute indicates that the first uplink transmission is considered as transmitted when the first uplink transmission is determined to be the fast cancellation.

14. The methods, apparatuses, and articles of any of clauses 1-13, wherein the dependent procedure comprises a half duplex handling procedure, and wherein the transmission indication attribute indicates that the first uplink transmission is considered as not transmitted when the first uplink transmission is determined to be the slow cancellation.

15. The methods, apparatuses, and articles of any of clauses 1-14, wherein the dependent procedure comprises a NDI interpretation procedure, and wherein the transmission indication attribute indicates that the first uplink transmission is considered as transmitted when the first uplink transmission is determined to be the fast cancellation.

16. The methods, apparatuses, and articles of any of clauses 1-15, wherein the dependent procedure comprises a NDI interpretation procedure, and wherein the transmission indication attribute indicates that the first uplink transmission is considered as transmitted when the first uplink transmission is determined to be the slow cancellation.

17. The methods, apparatuses, and articles of any of clauses 1-16, wherein the dependent procedure comprises a PHR in re-transmission procedure, and wherein the transmission indication attribute indicates that the first uplink transmission is considered as transmitted when the first uplink transmission is determined to be the fast cancellation.

18. The methods, apparatuses, and articles of any of clauses 1-17, wherein the dependent procedure comprises a PHR in re-transmission procedure, and wherein the transmission indication attribute indicates that the first uplink transmission is considered as transmitted when the first uplink transmission is determined to be the slow cancellation.

19. The methods, apparatuses, and articles of any of clauses 1-18, wherein the dependent procedure comprises a HARQ out-of-order procedure, and wherein the transmission indication attribute indicates that the first uplink transmission is considered as transmitted when the first uplink transmission is determined to be the fast cancellation.

20. The methods, apparatuses, and articles of any of clauses 1-19, wherein the dependent procedure comprises a HARQ out-of-order procedure, and wherein the transmission indication attribute indicates that the first uplink transmission is considered as transmitted when the first uplink transmission is determined to be the slow cancellation.

21. The methods, apparatuses, and articles of any of clauses 1-20, wherein the dependent procedure comprises a CA based SRS switching preemption procedure, and wherein the transmission indication attribute indicates that the first uplink transmission is considered as transmitted when the first uplink transmission is determined to be the fast cancellation.

22. The methods, apparatuses, and articles of any of clauses 1-21, wherein the dependent procedure comprises a CA based SRS procedure, and wherein the transmission indication attribute indicates that the first uplink transmission is considered as not transmitted when the first uplink transmission is determined to be the slow cancellation.

23. The methods, apparatuses, and articles of any of clauses 1-22, wherein the dependent procedure comprises a SRS for non-codebook based procedure, and wherein the transmission indication attribute indicates that the first uplink transmission is considered as not transmitted when the first uplink transmission is determined to be the fast cancellation.

24. The methods, apparatuses, and articles of any of clauses 1-23, wherein the dependent procedure comprises a SRS for non-codebook based procedure, and wherein the transmission indication attribute indicates that the first uplink transmission is considered as not transmitted when the first uplink transmission is determined to be the slow cancellation.

25. The methods, apparatuses, and articles of any of clauses 1-24, wherein the dependent procedure comprises an interpretation of reserved MCS procedure, and wherein the transmission indication attribute indicates that the first uplink transmission is considered as transmitted when the first uplink transmission is determined to be the fast cancellation.

26. The methods, apparatuses, and articles of any of clauses 1-25, wherein the dependent procedure comprises an interpretation of reserved MCS procedure, and wherein the transmission indication attribute indicates that the first uplink transmission is considered as transmitted when the first uplink transmission is determined to be the slow cancellation.

78. The methods, apparatuses, and articles of any of clauses 1-26, wherein the dependent procedure comprises an UL transmit switching state procedure, and wherein the transmission indication attribute indicates that the first uplink transmission is considered as transmitted when the first uplink transmission is determined to be the fast cancellation.

28. The methods, apparatuses, and articles of any of clauses 1-27, wherein the dependent procedure comprises an UL transmit switching state procedure, and wherein the transmission indication attribute indicates that the first uplink transmission is considered as not transmitted when the first uplink transmission is determined to be the slow cancellation.

29. The methods, apparatuses, and articles of any of clauses 1-28, wherein the dependent procedure comprises a determination of duplex direction procedure, and wherein the transmission indication attribute indicates that the first uplink transmission is considered as transmitted when the first uplink transmission is determined to be the fast cancellation.

30. The methods, apparatuses, and articles of any of clauses 1-29, wherein the dependent procedure comprises a determination of duplex direction procedure, and wherein the transmission indication attribute indicates that the first uplink transmission is considered as not transmitted when the first uplink transmission is determined to be the slow cancellation.

31. The methods, apparatuses, and articles of any of clauses 1-30, wherein the dependent procedure comprises a SRS codebook based procedure, and wherein the transmission indication attribute indicates that the first uplink transmission is considered as not transmitted when the first uplink transmission is determined to be the fast cancellation.

32. The methods, apparatuses, and articles of any of clauses 1-31, wherein the dependent procedure comprises a SRS codebook based procedure, and wherein the transmission indication attribute indicates that the first uplink transmission is considered as not transmitted when the first uplink transmission is determined to be the slow cancellation.

33. The methods, apparatuses, and articles of any of clauses 1-32, wherein the dependent procedure comprises a counting of active CSI resources procedure, and wherein the transmission indication attribute indicates that the first uplink transmission is considered as transmitted when the first uplink transmission is determined to be the fast cancellation.

34. The methods, apparatuses, and articles of any of clauses 1-33, wherein the dependent procedure comprises a counting of active CSI resources procedure, and wherein the transmission indication attribute indicates that the first uplink transmission is considered as transmitted when the first uplink transmission is determined to be the slow cancellation.

35. The methods, apparatuses, and articles of any of clauses 1-34, wherein the dependent procedure comprises a MAC CE action time procedure, and wherein the transmission indication attribute indicates that the first uplink transmission is considered as transmitted when the first uplink transmission is determined to be the fast cancellation.

36. The methods, apparatuses, and articles of any of clauses 1-35, wherein the dependent procedure comprises a MAC CE action time procedure, and wherein the transmission indication attribute indicates that the first uplink transmission is considered as transmitted when the first uplink transmission is determined to be the slow cancellation.

37. The methods, apparatuses, and articles of any of clauses 1-36, wherein the dependent procedure comprises a BSR procedure, and wherein the transmission indication attribute indicates that the first uplink transmission is considered as transmitted when the first uplink transmission is determined to be the fast cancellation.

38. The methods, apparatuses, and articles of any of clauses 1-37, wherein the dependent procedure comprises a BSR procedure, and wherein the transmission indication attribute indicates that the first uplink transmission is considered as not transmitted when the first uplink transmission is determined to be the slow cancellation.

39. The methods, apparatuses, and articles of any of clauses 1-38, wherein the dependent procedure comprises a RTT timer procedure, and wherein the transmission indication attribute indicates that the first uplink transmission is considered as not transmitted when the first uplink transmission is determined to be the fast cancellation.

40. The methods, apparatuses, and articles of any of clauses 1-39, wherein the dependent procedure comprises a RTT timer procedure, and wherein the transmission indication attribute indicates that the first uplink transmission is considered as not transmitted when the first uplink transmission is determined to be the slow cancellation.

41. The methods, apparatuses, and articles of any of clauses 1-40, wherein the dependent procedure comprises a HARQ attempt count procedure, and wherein the transmission indication attribute indicates that the first uplink transmission is considered as transmitted when the first uplink transmission is determined to be the fast cancellation.

42. The methods, apparatuses, and articles of any of clauses 1-41, wherein the dependent procedure comprises a HARQ attempt count procedure, and wherein the transmission indication attribute indicates that the first uplink transmission is considered as not transmitted when the first uplink transmission is determined to be the slow cancellation.

43. The methods, apparatuses, and articles of any of clauses 1-42, wherein the dependent procedure comprises a PHR calculation procedure, and wherein the transmission indication attribute indicates that the first uplink transmission is considered as transmitted when the first uplink transmission is determined to be the fast cancellation.

44. The methods, apparatuses, and articles of any of clauses 1-43, wherein the dependent procedure comprises a PHR calculation procedure, and wherein the transmission indication attribute indicates that the first uplink transmission is considered as not transmitted when the first uplink transmission is determined to be the slow cancellation.

45. Methods, apparatuses, and articles for wireless communication may provide for determining cancellation of a first uplink transmission to be fast cancellation or slow cancellation, and designating a first uplink transmission attribute for dependent procedure operation based upon whether the cancellation of the first uplink transmission is determined to be fast cancellation or is determined to be slow cancellation, wherein the dependent procedure is a procedure that is impacted by the cancellation of the first uplink transmission.

46. The methods, apparatuses, and articles of clause 45, wherein cancellation of the first uplink transmission includes an abortive uplink transmission selected from the group consisting of partially dropped transmission, partially cancelled transmission, fully dropped transmission, and fully cancelled transmission.

47. The methods, apparatuses, and articles of any of clauses 45-46, wherein cancellation of the first uplink transmission is due to at least one of transmission prioritization, uplink skipping, scheduling cancellation, scheduling overlap, power limitation, measurement gap, or conflict with a sidelink.

48. The methods, apparatuses, and articles of any of clauses 45-47, wherein the cancellation of the first uplink transmission is determined to be fast cancellation if the first uplink transmission is cancelled with insufficient time for cancellation processing by a device putatively transmitting the first uplink transmission to meet one or more timelines.

49. The methods, apparatuses, and articles of clause 48, wherein the one or more timelines include a timeline selected from the group consisting of a N1 timeline establishing a minimum gap from a last OFDM symbol of a PDSCH to a first OFDM symbol of HARQ ACK transmission, and a N2 timeline establishing a minimum gap from a last OFDM symbol of uplink DCI to an OFDM symbol of a PUSCH transmission.

50. The methods, apparatuses, and articles of any of clauses 45-49, wherein the cancellation of the first uplink transmission is determined to be slow cancellation if the first uplink transmission is cancelled with sufficient time for cancellation processing by a device putatively transmitting the first uplink transmission to meet one or more timelines.

51. The methods, apparatuses, and articles of clause 50, wherein the one or more timelines include a timeline selected from the group consisting of a N1 timeline establishing a minimum gap from a last OFDM symbol of a PDSCH to a first OFDM symbol of HARQ ACK transmission, and a N2 timeline establishing a minimum gap from a last OFDM symbol of uplink downlink control information (DCI) to an OFDM symbol of a PUSCH transmission.

52. The methods, apparatuses, and articles of any of clauses 45-51, wherein the first uplink transmission attribute designated for the dependent procedure operation based upon whether the cancellation of the first uplink transmission is determined to be fast cancellation or is determined to be slow cancellation comprises a transmission indication attribute.

53. The methods, apparatuses, and articles of clause 52, wherein the transmission indication attribute indicates to the dependent procedure that the first uplink transmission is considered as having been transmitted or is considered as not having been transmitted.

54. The methods, apparatuses, and articles of any of clauses 52-53, wherein the dependent procedure comprises a TPC accumulation procedure, and wherein the transmission indication attribute indicates that the first uplink transmission is considered as having been transmitted when the first uplink transmission is determined to be fast cancellation.

55. The methods, apparatuses, and articles of any of clauses 52-54, wherein the dependent procedure comprises a TPC accumulation procedure, and wherein the transmission indication attribute indicates that the first uplink transmission is considered as having been transmitted when the first uplink transmission is determined to be slow cancellation.

56. The methods, apparatuses, and articles of any of clauses 52-55, wherein the dependent procedure comprises a CC power scaling procedure, and wherein the transmission indication attribute indicates that the first uplink transmission is considered as having been transmitted when the first uplink transmission is determined to be fast cancellation.

57. The methods, apparatuses, and articles of any of clauses 52-56, wherein the dependent procedure comprises a CC power scaling procedure, and wherein the transmission indication attribute indicates that the first uplink transmission is considered as having n been transmitted when the first uplink transmission is determined to be slow cancellation.

58. The methods, apparatuses, and articles of any of clauses 52-57, wherein the dependent procedure comprises a CC MPR procedure, and wherein the transmission indication attribute indicates that the first uplink transmission is considered as having been transmitted when the first uplink transmission is determined to be fast cancellation.

59. The methods, apparatuses, and articles of any of clauses 52-58, wherein the dependent procedure comprises a CC MPR procedure, and wherein the transmission indication attribute indicates that the first uplink transmission is considered as having not been transmitted when the first uplink transmission is determined to be slow cancellation.

60. The methods, apparatuses, and articles of any of clauses 52-59, wherein the dependent procedure comprises a half duplex handling procedure, and wherein the transmission indication attribute indicates that the first uplink transmission is considered as having been transmitted when the first uplink transmission is determined to be fast cancellation.

61. The methods, apparatuses, and articles of any of clauses 52-60, wherein the dependent procedure comprises a half duplex handling procedure, and wherein the transmission indication attribute indicates that the first uplink transmission is considered as having not been transmitted when the first uplink transmission is determined to be slow cancellation.

62. The methods, apparatuses, and articles of any of clauses 52-61, wherein the dependent procedure comprises a NDI interpretation procedure, and wherein the transmission indication attribute indicates that the first uplink transmission is considered as having been transmitted when the first uplink transmission is determined to be fast cancellation.

63. The methods, apparatuses, and articles of any of clauses 52-62, wherein the dependent procedure comprises a NDI interpretation procedure, and wherein the transmission indication attribute indicates that the first uplink transmission is considered as having been transmitted when the first uplink transmission is determined to be slow cancellation.

64. The methods, apparatuses, and articles of any of clauses 52-63, wherein the dependent procedure comprises a PHR in re-transmission procedure, and wherein the transmission indication attribute indicates that the first uplink transmission is considered as having been transmitted when the first uplink transmission is determined to be fast cancellation.

65. The methods, apparatuses, and articles of any of clauses 52-64, wherein the dependent procedure comprises a PHR in re-transmission procedure, and wherein the transmission indication attribute indicates that the first uplink transmission is considered as having been transmitted when the first uplink transmission is determined to be slow cancellation.

66. The methods, apparatuses, and articles of any of clauses 52-65, wherein the dependent procedure comprises a HARQ out-of-order procedure, and wherein the transmission indication attribute indicates that the first uplink transmission is considered as having been transmitted when the first uplink transmission is determined to be fast cancellation.

67. The methods, apparatuses, and articles of any of clauses 52-66, wherein the dependent procedure comprises a HARQ out-of-order procedure, and wherein the transmission indication attribute indicates that the first uplink transmission is considered as having been transmitted when the first uplink transmission is determined to be slow cancellation.

68. The methods, apparatuses, and articles of any of clauses 52-67, wherein the dependent procedure comprises a CA based SRS switching preemption procedure, and wherein the transmission indication attribute indicates that the first uplink transmission is considered as having been transmitted when the first uplink transmission is determined to be fast cancellation.

69. The methods, apparatuses, and articles of any of clauses 52-68, wherein the dependent procedure comprises a CA based SRS procedure, and wherein the transmission indication attribute indicates that the first uplink transmission is considered as having not been transmitted when the first uplink transmission is determined to be slow cancellation.

70. The methods, apparatuses, and articles of any of clauses 52-69, wherein the dependent procedure comprises a SRS for non-codebook based procedure, and wherein the transmission indication attribute indicates that the first uplink transmission is considered as having not been transmitted when the first uplink transmission is determined to be fast cancellation.

71. The methods, apparatuses, and articles of any of clauses 52-70, wherein the dependent procedure comprises a SRS for non-codebook based procedure, and wherein the transmission indication attribute indicates that the first uplink transmission is considered as having not been transmitted when the first uplink transmission is determined to be slow cancellation.

72. The methods, apparatuses, and articles of any of clauses 52-71, wherein the dependent procedure comprises an interpretation of reserved MCS procedure, and wherein the transmission indication attribute indicates that the first uplink transmission is considered as having been transmitted when the first uplink transmission is determined to be fast cancellation.

73. The methods, apparatuses, and articles of any of clauses 52-72, wherein the dependent procedure comprises an interpretation of reserved MCS procedure, and wherein the transmission indication attribute indicates that the first uplink transmission is considered as having been transmitted when the first uplink transmission is determined to be slow cancellation.

74. The methods, apparatuses, and articles of any of clauses 52-73, wherein the dependent procedure comprises an UL transmit switching state procedure, and wherein the transmission indication attribute indicates that the first uplink transmission is considered as having been transmitted when the first uplink transmission is determined to be fast cancellation.

75. The methods, apparatuses, and articles of any of clauses 52-74, wherein the dependent procedure comprises an UL transmit switching state procedure, and wherein the transmission indication attribute indicates that the first uplink transmission is considered as having not been transmitted when the first uplink transmission is determined to be slow cancellation.

76. The methods, apparatuses, and articles of any of clauses 52-75, wherein the dependent procedure comprises a determination of duplex direction procedure, and wherein the transmission indication attribute indicates that the first uplink transmission is considered as having been transmitted when the first uplink transmission is determined to be fast cancellation.

77. The methods, apparatuses, and articles of any of clauses 52-76, wherein the dependent procedure comprises a determination of duplex direction procedure, and wherein the transmission indication attribute indicates that the first uplink transmission is considered as having not been transmitted when the first uplink transmission is determined to be slow cancellation.

78. The methods, apparatuses, and articles of any of clauses 52-77, wherein the dependent procedure comprises a SRS codebook based procedure, and wherein the transmission indication attribute indicates that the first uplink transmission is considered as having not been transmitted when the first uplink transmission is determined to be fast cancellation.

79. The methods, apparatuses, and articles of any of clauses 52-78, wherein the dependent procedure comprises a SRS codebook based procedure, and wherein the transmission indication attribute indicates that the first uplink transmission is considered as having not been transmitted when the first uplink transmission is determined to be slow cancellation.

80. The methods, apparatuses, and articles of any of clauses 52-79, wherein the dependent procedure comprises a counting of active CSI resources procedure, and wherein the transmission indication attribute indicates that the first uplink transmission is considered as having been transmitted when the first uplink transmission is determined to be fast cancellation.

81. The methods, apparatuses, and articles of any of clauses 52-80, wherein the dependent procedure comprises a counting of active CSI resources procedure, and wherein the transmission indication attribute indicates that the first uplink transmission is considered as having been transmitted when the first uplink transmission is determined to be slow cancellation.

82. The methods, apparatuses, and articles of any of clauses 52-81, wherein the dependent procedure comprises a MAC CE action time procedure, and wherein the transmission indication attribute indicates that the first uplink transmission is considered as having been transmitted when the first uplink transmission is determined to be fast cancellation.

83. The methods, apparatuses, and articles of any of clauses 52-82, wherein the dependent procedure comprises a MAC CE action time procedure, and wherein the transmission indication attribute indicates that the first uplink transmission is considered as having been transmitted when the first uplink transmission is determined to be slow cancellation.

84. The methods, apparatuses, and articles of any of clauses 52-83, wherein the dependent procedure comprises a BSR procedure, and wherein the transmission indication attribute indicates that the first uplink transmission is considered as having been transmitted when the first uplink transmission is determined to be fast cancellation.

85. The methods, apparatuses, and articles of any of clauses 52-84, wherein the dependent procedure comprises a BSR procedure, and wherein the transmission indication attribute indicates that the first uplink transmission is considered as having not been transmitted when the first uplink transmission is determined to be slow cancellation.

86. The methods, apparatuses, and articles of any of clauses 52-85 wherein the dependent procedure comprises a RTT timer procedure, and wherein the transmission indication attribute indicates that the first uplink transmission is considered as having not been transmitted when the first uplink transmission is determined to be fast cancellation.

87. The methods, apparatuses, and articles of any of clauses 52-86, wherein the dependent procedure comprises a RTT timer procedure, and wherein the transmission indication attribute indicates that the first uplink transmission is considered as having not been transmitted when the first uplink transmission is determined to be slow cancellation.

88. The methods, apparatuses, and articles of any of clauses 52-87, wherein the dependent procedure comprises a HARQ attempt count procedure, and wherein the transmission indication attribute indicates that the first uplink transmission is considered as having been transmitted when the first uplink transmission is determined to be fast cancellation.

89. The methods, apparatuses, and articles of any of clauses 52-88, wherein the dependent procedure comprises a HARQ attempt count procedure, and wherein the transmission indication attribute indicates that the first uplink transmission is considered as having not been transmitted when the first uplink transmission is determined to be slow cancellation.

90. The methods, apparatuses, and articles of any of clauses 52-89, wherein the dependent procedure comprises a PHR calculation procedure, and wherein the transmission indication attribute indicates that the first uplink transmission is considered as having been transmitted when the first uplink transmission is determined to be fast cancellation.

91. The methods, apparatuses, and articles of any of clauses 52-90, wherein the dependent procedure comprises a PHR calculation procedure, and wherein the transmission indication attribute indicates that the first uplink transmission is considered as having not been transmitted when the first uplink transmission is determined to be slow cancellation.

Those of skill would further appreciate that the various illustrative logical blocks, modules, circuits, and algorithm steps (e.g., the logical blocks in FIG. 6) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
determining cancellation of a first uplink transmission to be fast cancellation or slow cancellation, wherein the first uplink transmission is a fast cancellation if the first uplink transmission is cancelled with insufficient time for a device transmitting the first uplink transmission to meet a first one or more timelines of a plurality of timelines, and wherein the first uplink transmission is a slow cancellation if the first uplink transmission is cancelled with sufficient time for the device transmitting the first uplink transmission to meet a second one or more timelines of the plurality of timelines;
cancelling the first uplink transmission; and
providing a transmission indication attribute corresponding to the fast cancellation or the slow cancellation determination for the cancelled first uplink transmission for operation of a dependent procedure, wherein
the transmission indication attribute indicates that the cancelled first uplink transmission is considered as:
transmitted when the cancelled first uplink transmission is either of the fast cancellation or the slow cancellation, or
not transmitted when the cancelled first uplink transmission is either of the fast cancellation or the slow cancellation.

2. The method of claim 1, further comprising:
configuring the plurality of timelines to indicate at least one of:
a N1 timeline establishing a first minimum gap from a last orthogonal frequency division multiplex (OFDM) symbol of a physical downlink shared channel (PDSCH) to a first OFDM symbol of hybrid automatic repeat request (HARQ) acknowledgment (ACK) transmission; or
a N2 timeline establishing a second minimum gap from a last OFDM symbol of uplink downlink control information (DCI) to an OFDM symbol of a physical uplink shared channel (PUSCH) transmission, wherein the uplink DCI comprises DCE received via a downlink providing scheduling of uplink resources.

3. The method of claim 1, wherein the transmission indication attribute indicates that the cancelled first uplink transmission is considered as transmitted, and wherein the dependent procedure comprises a transmission power control (TPC) accumulation procedure.

4. The method of claim 1, wherein the transmission indication attribute indicates that the cancelled first uplink transmission is considered as transmitted, and wherein the dependent procedure comprises a new data indicator (NDI) interpretation procedure.

5. The method of claim 1, wherein the transmission indication attribute indicates that the cancelled first uplink transmission is considered as transmitted, and wherein the dependent procedure comprises a power headroom report (PHR) in re-transmission procedure.

6. The method of claim 1, wherein the transmission indication attribute indicates that the cancelled first uplink transmission is considered as transmitted, and wherein the dependent procedure comprises a hybrid automatic repeat request (HARQ) out-of-order procedure.

7. The method of claim 1, wherein the transmission indication attribute indicates that the cancelled first uplink transmission is considered as transmitted, and wherein the dependent procedure comprises an interpretation of reserved modulation coding scheme (MCS) procedure.

8. The method of claim 1, wherein the transmission indication attribute indicates that the cancelled first uplink transmission is considered as transmitted, and wherein the dependent procedure comprises a counting of active channel state indicator (CSI) resources procedure.

9. The method of claim 1, wherein the transmission indication attribute indicates that the cancelled first uplink transmission is considered as transmitted, and wherein the dependent procedure comprises a medium access control (MAC) control element (CE) action time procedure.

10. The method of claim 1, wherein the transmission indication attribute indicates that the cancelled first uplink transmission is considered as not transmitted, and wherein the dependent procedure comprises a secondary reference signal (SRS) codebook based procedure.

11. The method of claim 1, wherein the transmission indication attribute indicates that the cancelled first uplink transmission is considered as not transmitted, and wherein the dependent procedure comprises a round trip time (RTT) timer procedure.

12. An apparatus configured for wireless communication, the apparatus comprising:
- at least one memory configured to store instructions; and
- at least one processor, wherein the at least one processor is communicatively coupled to the at least one memory and is configured to execute the instructions to:
  - determine cancellation of a first uplink transmission to be fast cancellation or slow cancellation, wherein the first uplink transmission is a fast cancellation if the first uplink transmission is cancelled with insufficient time for a device transmitting the first uplink transmission to meet a first one or more timelines of a plurality of timelines, and wherein the first uplink transmission is a slow cancellation if the first uplink transmission is cancelled with sufficient time for the device transmitting the first uplink transmission to meet a second one or more timelines of the plurality of timelines;
  - cancel the first uplink transmission; and
  - provide a transmission indication attribute corresponding to the fast cancellation or the slow cancellation determination for the cancelled first uplink transmission for operation of a dependent procedure, wherein:
  - the transmission indication attribute indicates that the cancelled first uplink transmission is considered as:
    - transmitted when the cancelled first uplink transmission is either of the fast cancellation or the slow cancellation, or
    - not transmitted when the cancelled first uplink transmission is either of the fast cancellation or the slow cancellation.

13. An apparatus configured for wireless communication, the apparatus comprising:
- at least one memory configured to store instructions; and
- at least one processor, wherein the at least one processor is communicatively coupled to the at least one memory and is configured to execute the instructions to:
  - determine cancellation of a first uplink transmission to be fast cancellation or slow cancellation, wherein the first uplink transmission is a fast cancellation if the first uplink transmission is cancelled with insufficient time for a device transmitting the first uplink transmission to meet a first one or more timelines of a plurality of timelines, and wherein the first uplink transmission is a slow cancellation if the first uplink transmission is cancelled with sufficient time for the device transmitting the first uplink transmission to meet a second one or more timelines of the plurality of timelines;
  - cancel the first uplink transmission; and
  - provide a transmission indication attribute corresponding to the fast cancellation or the slow cancellation determination for the cancelled first uplink transmission for operation of a dependent procedure, wherein:
  - the transmission indication attribute indicates that the cancelled first uplink transmission is considered as:
    - transmitted when the cancelled first uplink transmission is determined to be the fast cancellation, or
    - not transmitted when the cancelled first uplink transmission is determined to be the slow cancellation.

14. The apparatus of claim 13, wherein the dependent procedure comprises a carrier aggregation (CA) based secondary reference signal (SRS) switching preemption procedure.

15. The apparatus of claim 13, wherein the dependent procedure comprises a determination of duplex direction procedure.

16. The apparatus of claim 13, wherein the dependent procedure comprises a buffer state report (BSR) procedure.

17. The apparatus of claim 13, wherein the dependent procedure comprises a hybrid automatic repeat request (HARQ) attempt count procedure.

18. The apparatus of claim 13, wherein the dependent procedure comprises a power headroom report (PHR) calculation procedure.

* * * * *